United States Patent
Gu

(10) Patent No.: US 10,756,997 B2
(45) Date of Patent: Aug. 25, 2020

(54) BANDWIDTH ADJUSTMENT FOR REAL-TIME VIDEO TRANSMISSION

(71) Applicant: Cybrook Inc., Santa Clara, CA (US)

(72) Inventor: Qunshan Gu, Santa Clara, CA (US)

(73) Assignee: Cybrook Inc., Santa Clara, CA (US)

( * ) Notice: Subject to any disclaimer, the term of this patent is extended or adjusted under 35 U.S.C. 154(b) by 0 days.

(21) Appl. No.: 15/155,894

(22) Filed: May 16, 2016

(65) Prior Publication Data

US 2017/0094295 A1 Mar. 30, 2017

Related U.S. Application Data

(63) Continuation-in-part of application No. 14/982,698, filed on Dec. 29, 2015, which is a
(Continued)

(51) Int. Cl.
*H04L 12/26* (2006.01)
*H04N 19/89* (2014.01)
*H04N 19/65* (2014.01)
*H04L 1/00* (2006.01)
*H04N 19/166* (2014.01)
(Continued)

(52) U.S. Cl.
CPC ........ *H04L 43/0864* (2013.01); *H04L 1/0002* (2013.01); *H04L 1/004* (2013.01); *H04L 1/0007* (2013.01); *H04L 1/0009* (2013.01); *H04L 1/0025* (2013.01); *H04L 43/0829* (2013.01); *H04L 43/0894* (2013.01); *H04N 19/105* (2014.11); *H04N 19/115* (2014.11); *H04N 19/166* (2014.11); *H04N 19/172* (2014.11);
(Continued)

(58) Field of Classification Search
CPC ............................... H04N 19/00; H04L 47/25
See application file for complete search history.

(56) References Cited

U.S. PATENT DOCUMENTS 5,329,318 A 7/1994 Keith
5,398,072 A 3/1995 Auld
(Continued)

FOREIGN PATENT DOCUMENTS

CN 1490980 A 4/2004
CN 1655547 A 8/2005
(Continued)

*Primary Examiner* — Brian T Pendleton
*Assistant Examiner* — Kyle M Lotfi

(57) ABSTRACT

A method for bandwidth adjustment for real-time video transmission includes: transmitting, by a sender, a first portion of the video bitstream encoded using a current bitrate and transmitted as a series of data packets, receiving, by the sender, a back channel message from a receiver, in which the back channel message includes receiver-side bandwidth parameters determined by the receiver in response to receiving the series of data packets, in which the receiver-side bandwidth parameters include at least one of an accumulated time difference parameter, a received bitrate parameter, a packet loss ratio parameter, a bandwidth indicator parameter, and an FEC ratio parameter, adjusting, by the sender using the processor, the current bitrate for encoding the video bitstream based on the receiver-side bandwidth parameters, and transmitting, to the receiver, a second portion of the video bitstream encoded using the adjusted current bitrate.

20 Claims, 16 Drawing Sheets

Related U.S. Application Data continuation-in-part of application No. 14/867,143, filed on Sep. 28, 2015.

(51) Int. Cl.
*H04N 19/105* (2014.01)
*H04N 19/172* (2014.01)
*H04N 19/115* (2014.01)
*H04L 1/18* (2006.01)

(52) U.S. Cl.
CPC ............ *H04N 19/65* (2014.11); *H04N 19/89* (2014.11); *H04L 1/1887* (2013.01)

(56) References Cited

U.S. PATENT DOCUMENTS

| | | | |
|---|---|---|---|
| 5,594,736 | A | 1/1997 | Tatsumi et al. |
| 5,724,091 | A | 3/1998 | Freeman et al. |
| 6,975,641 | B1 | 12/2005 | Kurobe et al. |
| 6,985,501 | B2 | 1/2006 | Suzuki et al. |
| 7,042,948 | B2 | 5/2006 | Kim et al. |
| 7,180,858 | B1* | 2/2007 | Roy .................... H04L 43/0888 370/229 |
| 7,272,299 | B2 | 9/2007 | Notoya et al. |
| 7,336,678 | B2 | 2/2008 | Vinnakota et al. |
| 7,809,850 | B2 | 10/2010 | Shimizu et al. |
| 7,844,725 | B2* | 11/2010 | Labonte ................ H04L 65/80 370/229 |
| 7,852,764 | B2 | 12/2010 | Yamaguchi et al. |
| 7,969,883 | B2 | 6/2011 | Balint et al. |
| 7,992,177 | B2 | 8/2011 | Perry et al. |
| 8,689,343 | B2 | 4/2014 | De Laet |
| 9,210,419 | B2 | 12/2015 | Barrett et al. |
| 9,537,779 | B2 | 1/2017 | Dung Dao |
| 9,756,356 | B2 | 9/2017 | Yang et al. |
| 9,998,890 | B2 | 6/2018 | Marko |
| 2002/0027884 | A1 | 3/2002 | Halme |
| 2002/0044528 | A1* | 4/2002 | Pogrebinsky ........... H04L 47/10 370/230 |
| 2002/0064169 | A1 | 5/2002 | Gummalla et al. |
| 2004/0015765 | A1 | 1/2004 | Cooper et al. |
| 2004/0233844 | A1 | 11/2004 | Yu et al. |
| 2007/0206673 | A1 | 9/2007 | Cipolli et al. |
| 2007/0223586 | A1 | 9/2007 | Nagai et al. |
| 2008/0008270 | A1 | 1/2008 | Li et al. |
| 2008/0101466 | A1 | 5/2008 | Swenson et al. |
| 2008/0102772 | A1* | 5/2008 | Gandhi ............... H04L 41/0896 455/187.1 |
| 2009/0013356 | A1 | 1/2009 | Doerr et al. |
| 2009/0021572 | A1 | 1/2009 | Garudadri et al. |
| 2009/0070610 | A1 | 3/2009 | Nishida et al. |
| 2009/0310670 | A1* | 12/2009 | Odagawa ................. H04N 7/24 375/240.01 |
| 2010/0157825 | A1 | 6/2010 | Anderlind et al. |
| 2011/0072148 | A1* | 3/2011 | Begen ................ H04L 65/4076 709/231 |
| 2011/0149087 | A1 | 6/2011 | Jeong et al. |
| 2011/0249729 | A1* | 10/2011 | Zhou .................... H04N 19/105 375/240.07 |
| 2011/0280307 | A1 | 11/2011 | MacInnis et al. |
| 2013/0315584 | A1 | 11/2013 | Hosking |
| 2014/0126715 | A1 | 5/2014 | Lum et al. |
| 2015/0019740 | A1 | 1/2015 | Zhao |
| 2015/0181285 | A1 | 6/2015 | Zhang et al. |
| 2015/0215223 | A1* | 7/2015 | Spencer ................ H04L 47/365 370/471 |
| 2015/0222555 | A1 | 8/2015 | Rickeby et al. |
| 2016/0094470 | A1 | 3/2016 | Skog |

FOREIGN PATENT DOCUMENTS

| | | |
|---|---|---|
| CN | 1764184 A | 4/2006 |
| CN | 1980238 A | 6/2007 |
| CN | 101207823 A | 6/2008 |
| CN | 101222296 A | 7/2008 |
| CN | 101578842 A | 11/2009 |
| CN | 102106113 A | 6/2011 |
| CN | 103051978 A | 4/2013 |
| CN | 103167359 A | 6/2013 |
| CN | 103931146 A | 7/2014 |
| CN | 104604209 A | 5/2015 |
| CN | 104618195 A | 5/2015 |
| CN | 104683863 A | 6/2015 |
| CN | 104902274 A | 9/2015 |
| CN | 105163134 A | 12/2015 |

\* cited by examiner

BANDWIDTH ADJUSTMENT FOR REAL-TIME VIDEO TRANSMISSION

CROSS-REFERENCE TO RELATED APPLICATION

This application is a continuation-in-part of U.S. patent application Ser. No. 14/982,698 titled "Video Encoding and Decoding with Back Channel Message Management," filed Dec. 29, 2015, which is in a continuation-in-part of U.S. patent application Ser. No. 14/867,143 titled "Method and System of Video Processing with Back Channel Message Management," filed Sep. 28, 2015, the contents of both of which are incorporated herein by reference in their entireties.

TECHNICAL FIELD

This disclosure relates to video encoding and decoding and particularly to video coding and decoding using back channel messaging for initial bandwidth estimation and bandwidth adjustment in real-time video transmission.

BACKGROUND

Digital video streams can be encoded to efficiently compress the video into a digital bitstream for storage on non-transitory digital media or streaming transmission through bandwidth-limited communication channels. However, packet loss and other errors can occur during video bitstream transmission or storage, resulting in errors in decoding the bitstream. It is also common that the available channel bandwidth can change from time to time, causing problems in real-time video transmission.

SUMMARY

The present disclosure aims to provide methods and apparatuses for initial bandwidth estimation for real-time video transmission.

In one aspect, disclosed herein is a method of adjusting bandwidth for transmitting a video bitstream to a receiver, comprising transmitting, by a sender, a first portion of the video bitstream encoded using a current bitrate and transmitted as a series of data packets, receiving, by the sender, a back channel message from the receiver, wherein the back channel message comprises receiver-side bandwidth parameters determined by the receiver in response to receiving the series of data packets, wherein the receiver-side bandwidth parameters comprise at least one of an accumulated time difference parameter, a received bitrate parameter, a packet loss ratio parameter, a bandwidth indicator parameter, and a FEC ratio parameter, adjusting, by the sender using the processor, the current bitrate for encoding the video bitstream based on the receiver-side bandwidth parameters, and transmitting, to the receiver, a second portion of the video bitstream encoded using the adjusted current bitrate.

In another aspect, disclosed herein is a method of adjusting bandwidth for receiving a video bitstream from a sender, comprising receiving, by a receiver, one or more data packets associated with a first portion of the video bitstream encoded using a current bitrate and transmitted as a series of data packets, determining, by the receiver using a processor, receiver-side bandwidth parameters based on the received one of more data packets, wherein the receiver-side bandwidth parameters comprise at least one of an accumulated time difference parameter, a received bitrate parameter, a packet loss ratio parameter, a bandwidth indicator parameter, and a FEC ratio parameter, decoding the encoded first portion of the video bitstream from the one or more data packets, transmitting, to the sender and in response to receiving the one or more data packets, one or more back channel messages each comprising the receiver-side bandwidth parameters, and receiving, from the sender, a second portion of the video bitstream encoded using an adjusted current bitrate determined based on the receiver-side bandwidth parameters in response to receiving the one or more back channel messages.

Details of these implementations, modifications of these implementations, and additional implementations are described below.

BRIEF DESCRIPTION OF THE DRAWINGS

Various implementations of the invention are best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
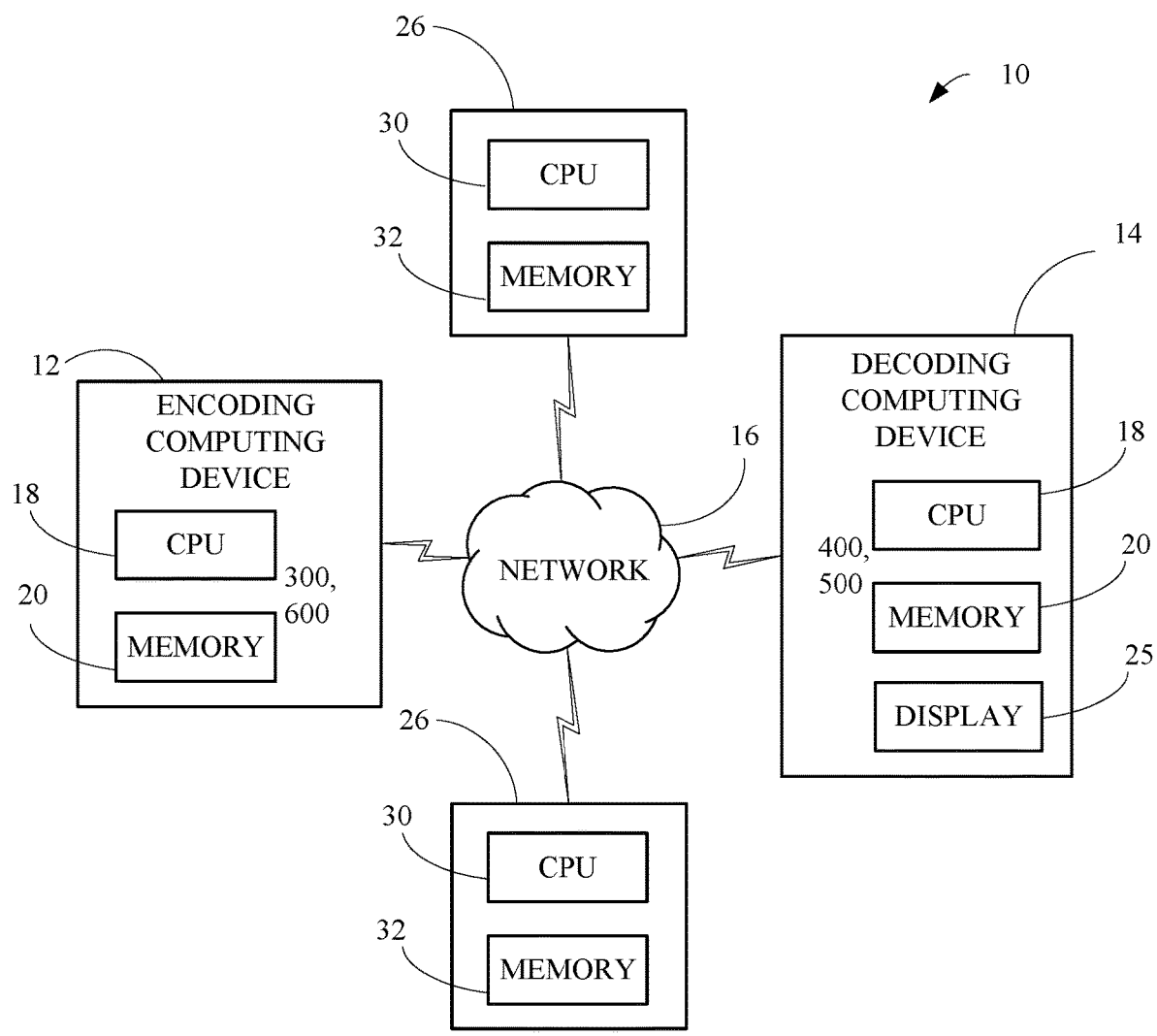
FIG. 1A is a schematic of a video encoding and decoding system in accordance with implementations of this disclosure.

Digital video can be used for entertainment, video conferencing, advertising and general information sharing. User expectation for digital video quality can be high, as users expect video over shared internet networks with limited bandwidth to have the same high spatial and temporal quality as video broadcast over dedicated cable channels. Digital video encoding can compress a digital video bitstream to permit high quality digital video to be transmitted over a network having limited bandwidth, for example. Digital video quality can be defined as the degree to which output decompressed and decoded digital video matches the input digital video, for example.

Video encoding and decoding incorporate techniques that compress and decompress digital video streams to permit transmission of high quality digital video streams over networks that can have limited bandwidth capability. These techniques can treat digital video streams as sequences of blocks of digital data and process the blocks to compress the data for transmission or storage and, once received, decompress the blocks to re-create the original digital video stream. This compression and de-compression sequence can be "lossy" in the sense that the de-compressed digital video might not exactly match the input digital video. This can be measured by measuring the difference between pixel data in the input video stream and corresponding pixels in the encoded, transmitted and decoded video stream, for example. The amount of distortion introduced into a digital video stream by encoding and decoding the digital video stream can be a function of the amount of compression, thus the quality of the decoded video can be viewed as a function of the transmission bandwidth.

Disclosed implementations can permit transmission of compressed video bitstreams over "noisy" or potentially error inducing networks by adjusting the bitrate of the transmitted video bitstream to match the capacity of the channel or network over which it is transmitted. Implementations can test the network prior to transmitting compressed digital video bitstreams by transmitting one or more data packets to a decoder and analyzing return packets to determine an optimal compression ratio for the digital video. A packet can, for example, includes one or more messages. A packet can also include video or audio data, with or without carrying a message. Implementations can periodically re-test the network by analyzing data packets sent by the decoder to the encoder that include information regarding the network. Adjusting the bitrate can increase or decrease the spatial and temporal quality of the decoded video bitstream as compared to the input digital video stream, where higher bitrates can support higher quality digital video.

Disclosed implementations can also transmit compressed video bitstreams over noisy networks by adding forward error correction (FEC) packets to the compressed video bitstream. FEC packets redundantly encode some or all of the information in a digital video bitstream in additional packets included in the bitstream. By processing the additional packets, a decoder can detect missing or corrupt information in a digital video stream and, in some cases, reconstruct the missing or corrupt data using the redundant data in the additional packets. Implementations can adjust parameters associated with FEC based on network information packets received by the encoder as discussed above. Adjusting the FEC parameters dynamically can divide available network bandwidth between transmitting digital video data and FEC data to permit the maximum quality image per unit time to be transmitted under given network conditions.

Disclosed implementations can change encoder and FEC parameters to permit the highest quality possible digital video to be transmitted for given network conditions as the digital video bitstream is being transmitted. Changing these parameters can also affect the quality of the decoded video stream, since they can cause rapid changes in the appearance of the decoded video as it is being viewed. Implementations can control the changes in encoder and FEC parameters to avoid rapid changes in video quality by analyzing trends in parameter changes and anticipating changes in parameter values.

FIG. 1A is a schematic of a video encoding and decoding system 10 in which implementations can be provided. A computing device 12, in one example, can include an internal configuration of hardware including a processor such as a central processing unit (CPU) 18 and a digital data storage exemplified by memory 20. CPU 18 can a controller for controlling the operations of computing device 12, and can be a microprocessor, digital signal processor, field programmable gate array, discrete circuit elements laid out in a custom application specific integrated circuit (ASIC), or any other digital data processor, for example. CPU 18 can be connected to memory 20 by a memory bus, wires, cables, wireless connection, or any other connection, for example. Memory 20 can be or include read-only memory (ROM), random access memory (RAM), optical storage, magnetic storage such as disk or tape, non-volatile memory cards, cloud storage or any other manner or combination of suitable digital data storage device or devices. Memory 20 can store data and program instructions that are used by CPU 18. Other suitable implementations of computing device 12 are possible. For example, the processing of computing device 12 can be distributed among multiple devices communicating over multiple networks 16. In FIG. 1, the computing device 12 can be an encoding computing device, i.e., a computing device comprising an encoder. The encoding computing device 12 incorporates encoder elements 300 and processes 600A that can incorporate hardware and software elements and associated methods to implement the encoding device 12, as described in more detail below.

In one example, a network 16 can connect computing device 12 and computing device 14 for encoding and decoding a video stream. For example, the video stream can be encoded in computing device 12 and the encoded video stream is decoded in computing device 14. Network 16 can include any network or networks that are appropriate to the application at hand, such as wired or wireless local or wide area networks, virtual private networks, cellular telephone data networks, or any other wired or wireless configuration of hardware, software, communication protocol suitable to transfer a video bitstream from computing device 12 to computing device 14 and communicate parameters regarding the network from computing device 14 to computing device 12 in the illustrated example.

Computing device 14 can includes CPU 18 and memory 20, which can be similar to components as discussed above in conjunction with the system 12. Computing device 14 can be a decoding computing device 14 that incorporates decoder elements 400 and processes 500C that can incorporate hardware and software elements and associated processes to implement the decoding device 14, as described in more detail below, and configured to display a video stream, for example. A display 25 associated with the computing/decoding device 14 and can be implemented in various ways, including by a liquid crystal display (LCD), a cathode-ray tube (CRT), organic or non-organic light emitting diode display (LED), plasma display, or any other mechanism to display a machine-readable video signal to a user. Computing device 14 can be configured to display a rendering of the video bitstream decoded by a decoder in computing device 14, for example.

Other implementations of encoder and decoder system 10 are possible. In addition to computing device 12 and computing device 14, FIG. 1 shows additional computing devices 26 each having one or more CPUs 30 and memories 32 respectively. These computing devices can include servers, and mobile phones, which can also create, encode, decode, store, forward or display digital video streams, for example. Each of these computing devices can have differing capabilities in terms of processing power and memory availability, including devices for creating video such as video cameras and devices for displaying video.

Figure 1B:
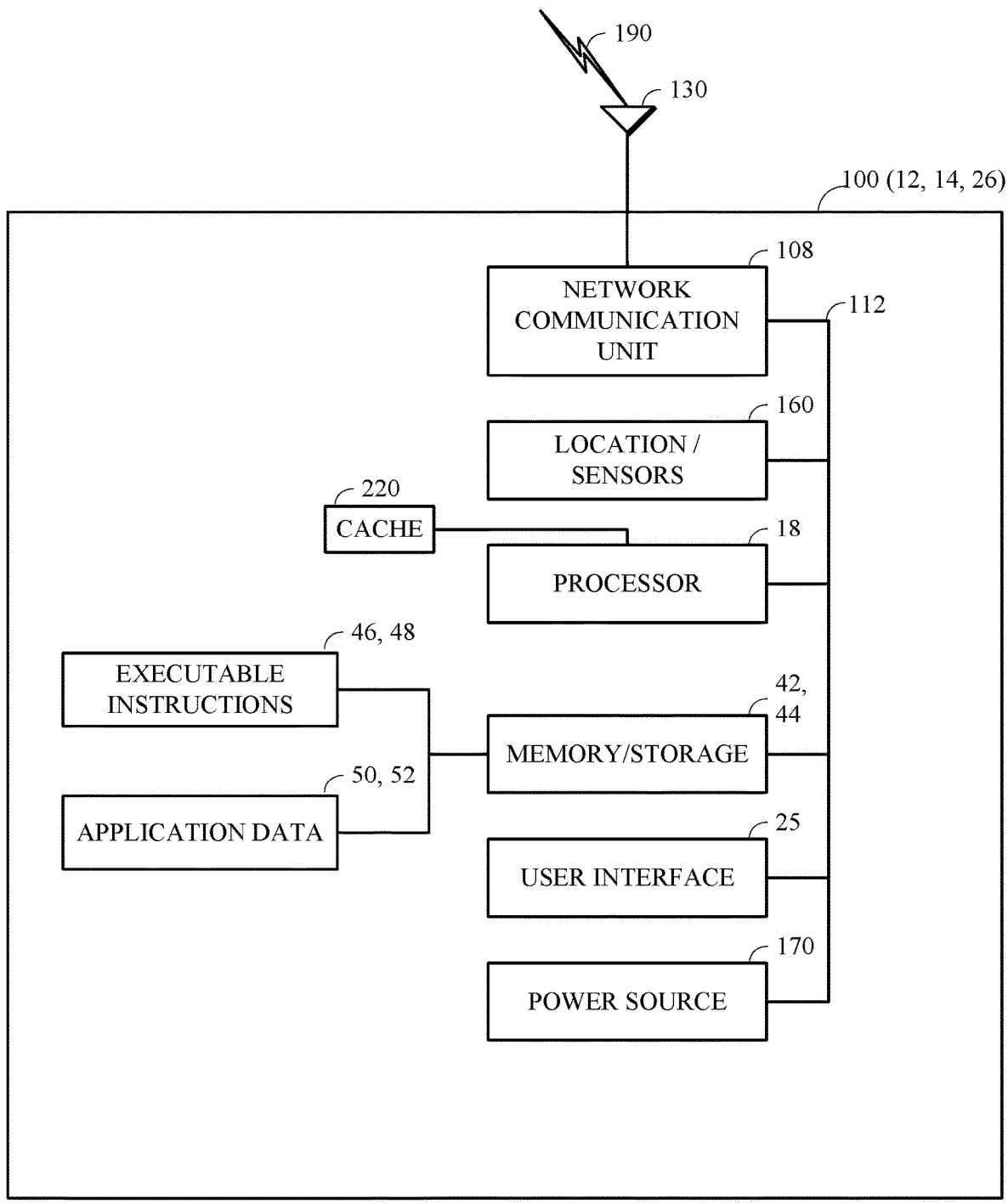
FIG. 1B is a block diagram of an example computing device that can be used in accordance with implementations of this disclosure.

FIG. 1B is a block diagram of an example internal configuration of a computing device 100, such as the devices 12, 14, and 26 as shown in FIG. 1A. As previously described, the device 100 can take the form of a computing system including multiple computing units, or in the form of a single computing unit, for example, a mobile phone, a tablet computer, a laptop computer, a notebook computer, a desktop computer, a server computer and the like.

Figure 2:
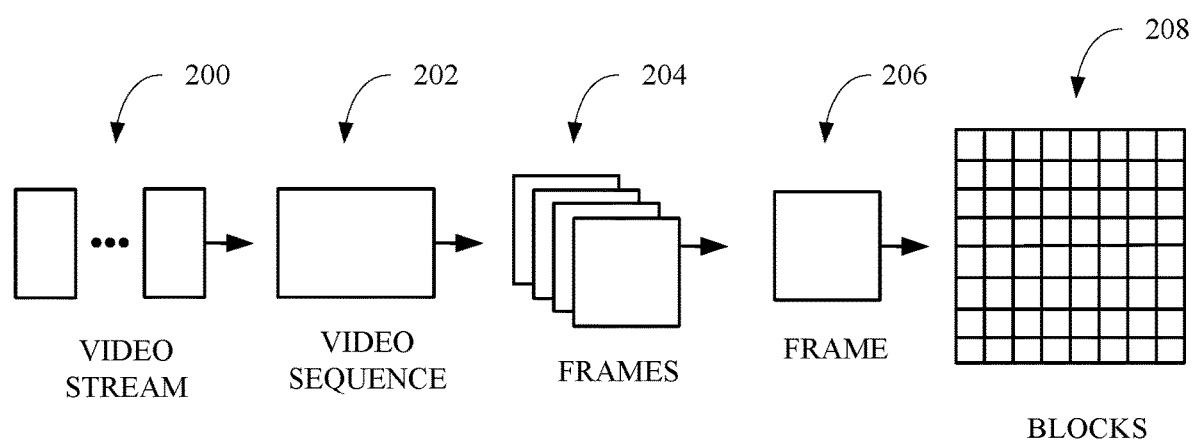
FIG. 2 is a block diagram of a video stream in accordance with implementations of this disclosure.

The computing device 100 can include a number of components, as illustrated in FIG. 2. CPU (or processor) 18 can be a central processing unit, such as a microprocessor, and can include single or multiple processors, each having single or multiple processing cores. Alternatively, CPU 18 can include another type of device, or multiple devices, capable of manipulating or processing information now-existing or hereafter developed. When multiple processing devices are present, they can be interconnected in any manner, including hardwired or networked, including wirelessly networked. Thus, the operations of CPU 18 can be distributed across multiple machines that can be coupled directly or across a local area or other network The CPU 18 can be a general purpose processor or a special purpose processor.

Random Access Memory (RAM 42) can be any suitable non-permanent storage device that is used as memory. RAM 42 can include executable instructions and data for immediate access by CPU 18. RAM 42 typically comprises one or more DRAM modules such as DDR SDRAM. Alternatively, RAM 42 can include another type of device, or multiple devices, capable of storing data for processing by CPU 18 now-existing or hereafter developed. CPU 18 can access and manipulate data in RAM 42 via bus 112. The CPU 18 can utilize a cache 120 as a form of localized fast memory for operating on data and instructions.

Storage 44 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 44 can include executable instructions 48 and application files/data 52 along with other data. The executable instructions 48 can include, for example, an operating system and one or more application programs for loading in whole or part into RAM 42 (with RAM-based executable instructions 46 and application files/data 50) and to be executed by CPU 18. The executable instructions 48 can be organized into programmable modules or algorithms, functional programs, codes, and code segments designed to perform various functions described herein.

The term module, as used herein, can be implemented using hardware, software, or a combination thereof. A module can form a part of a larger entity, and can itself be broken into sub-entities. When a module is implemented using software, this software can be implemented as algorithmic components comprising program instructions stored in a memory, the instructions designed to be executed on a processor. The term "module" does not require any specific form of coding structure, and functional aspects of different modules can be independent but also can overlap and be performed by common program instructions. For example, a first module and a second module can be implemented using a common set of program instructions without distinct boundaries between the respective and/or common instructions that implement the first and second modules.

The operating system can be can be an operating system for a small device, such as a smart phone or tablet device, or a large device, such as a mainframe computer. The application program can include, for example, a web browser, web server and/or database server. Application files 52 can, for example, include user files, database catalogs and configuration information. In an implementation, storage 44 includes instructions to perform the discovery techniques described herein. Storage 44 can comprise one or multiple devices and can utilize one or more types of storage, such as solid state or magnetic.

The computing device 100 can also include one or more input/output devices, such as a network communication unit 108 and interface 130 that can have a wired communication component or a wireless communications component 190, which can be coupled to CPU 18 via bus 112. The network communication unit 108 can utilized any of a variety of standardized network protocols, such as Ethernet, TCP/IP, to name a few of many protocols, to effect communications between devices. The interface 130 can comprise one or more transceiver(s) that utilize the Ethernet, power line communication (PLC), WiFi, infrared, GPRS/GSM, CDMA, etc.

A user interface 25 can include a display, positional input device (such as a mouse, touchpad, touchscreen, or the like), keyboard, or other forms of user input and output devices. The user interface 25 can be coupled to the processor 18 via the bus 112. A graphical user interface (GUI) 25 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and can accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 100 are also possible. For example, servers can omit display 25. RAM 42 or storage 44 can be distributed across multiple machines such as network-based memory or memory in multiple machines performing the operations of clients or servers. Although depicted here as a single bus, bus 112 can be composed of multiple buses, that can be connected to each other through various bridges, controllers, and/or adapters. Computing devices 100 can contain any number of sensors and detectors that monitor the device 100 itself or the environment around the device 100, or it can contain a location identification unit 160, such as a GPS or other type of location device. The computing device 100 can also contain a power source 170, such as a battery, so that the unit can operate in a self-contained manner. These can communicate with the CPU/processor 18 via the bus 112.

FIG. 2 is a block diagram of a video stream 200 to be encoded and subsequently decoded. Video stream 200 can include a video sequence 202. A video sequence 200 is a temporally contiguous subset of a video stream, also called a group of pictures (GOP). Video sequence 202 can include a number of adjacent video frames 204. While four frames are depicted in adjacent frames 204, video sequence 202 can include any number of adjacent frames. A single example of the adjacent frames 204 is illustrated as the single frame 206. Further sub-dividing the single frame 206 can yield a series of blocks 208. In this example, blocks 208 can contain data corresponding to an N×M pixel region in frame 206, such as luminance and chrominance data for the corresponding pixels. Blocks 208 can be of any suitable size such as 128×128 pixel groups or any rectangular subset of the pixel group.

Figure 3:
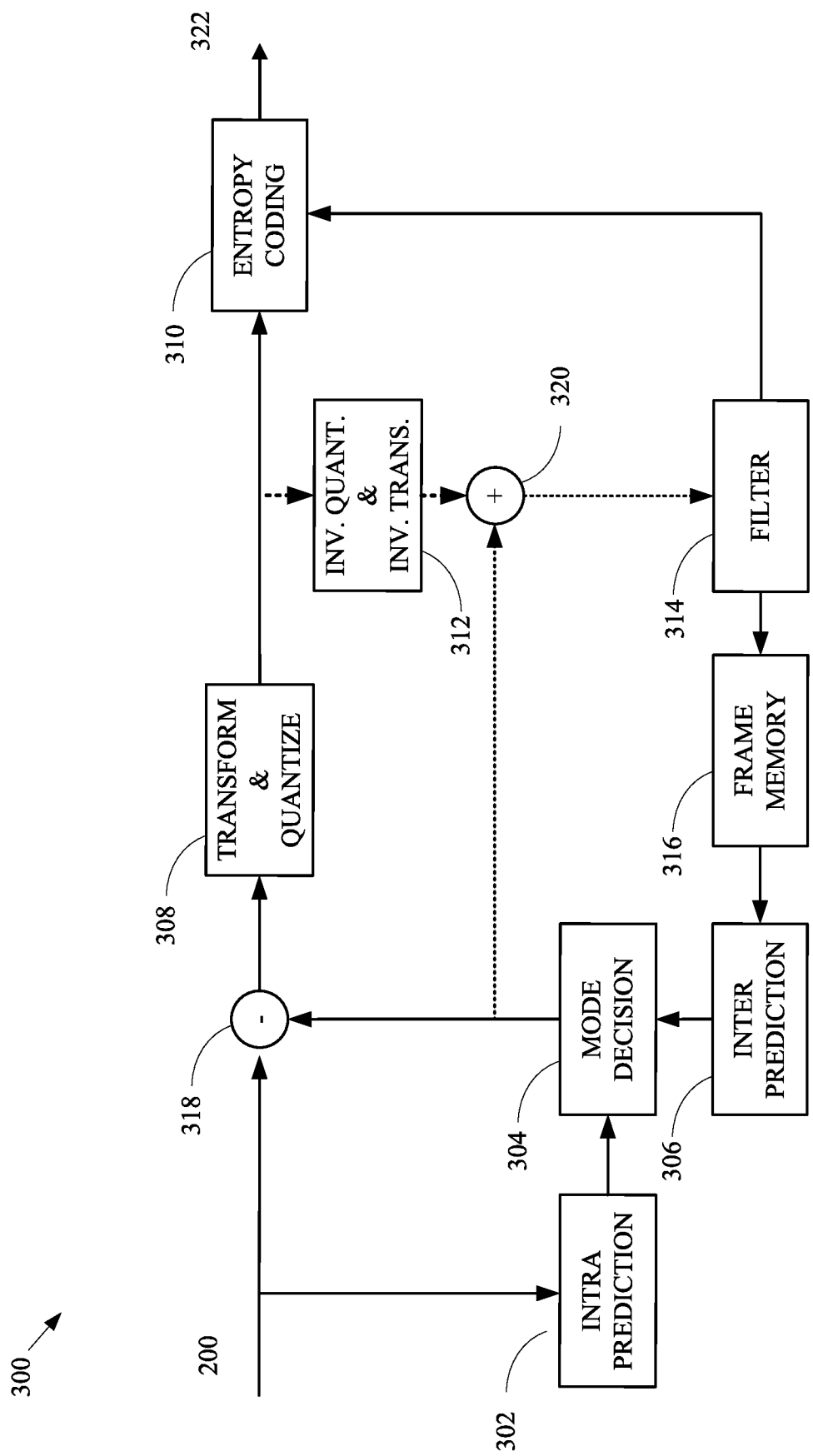
FIG. 3 is a block diagram of a video compression system in accordance with implementations of this disclosure.

FIG. 3 is a block diagram of an encoder 300 in accordance with disclosed implementations. Encoder 300 can be implemented in a computing device such as computing device 12. Encoder 300 can encode an input video stream 200. Encoder 300 includes stages to perform the various functions in a forward path to produce an encoded and/or a compressed bitstream 322: an intra prediction stage 302, mode decision stage 304, an inter prediction stage 306, transform and quantization stage 308, a filter stage 314 and an entropy encoding stage 40. Encoder 300 can also include a reconstruction path to reconstruct a frame for prediction and encoding of future blocks. In FIG. 3, encoder 300 includes an inverse quantization and inverse transform stage 312 and a frame memory 316 that can be used to store multiple frames of video data to reconstruct blocks for prediction. Other structural variations of encoder 300 can be used to encode video stream 200.

When video stream 200 is presented for encoding, each frame (such as frame 206 from FIG. 2) within video stream 200 is processed in units of blocks. Each block can be processed separately in raster scan order starting from the upper left hand block. At intra prediction stage 302 intra prediction residual blocks can be determined for the blocks of video stream 200. Intra prediction can predict the contents of a block by examining previously processed nearby blocks to determine if the pixel values of the nearby blocks are similar to the current block. Since video streams 200 are processed in raster scan order, blocks that occur in raster scan order ahead of the current block are available for processing the current block. Blocks that occur before a given block in raster scan order can be used for intra prediction because they will be available for use at a decoder since they will have already been reconstructed. If a nearby block is similar enough to the current block, the nearby block can be used as a prediction block and subtracted 318 from the current block to form a residual block and information indicating that the current block was intra-predicted can be included in the video bitstream.

Video stream 200 can also be inter predicted at inter prediction stage 306. Inter prediction includes forming a residual block from a current block by translating pixels from a temporally nearby frame to form a prediction block that can be subtracted 318 from the current block. Temporally adjacent frames can be stored in frame memory 316 and accessed by inter prediction stage 306 to form a residual block that can be passed to mode decision stage 304 where the residual block from intra prediction can be compared to the residual block from inter prediction. The mode decision stage 302 can determine which prediction mode, inter or intra, to use to predict the current block. Implementations can use rate distortion value to determine which prediction mode to use, for example.

Rate distortion value can be determined by calculating the number or bits per unit time or bitrate of a video bitstream encoded using particular encoding parameter, such as prediction mode, for example, combined with calculated differences between blocks from the input video stream and blocks in the same position temporally and spatially in the decoded video stream. Since encoder 300 is "lossy", pixel values in blocks from the decoded video stream can differ from pixel values in blocks from the input video stream. Encoding parameters can be varied and respective rate distortion values compared in order to determine optimal parameter values, for example.

At subtraction stage 318 the residual block determined by mode decision stage 304 can be subtracted from the current block and passed to transform and quantize stage 308. Since the values of the residual block can be smaller than the values in the current block, the transformed and quantized 308 residual block can have fewer values than the transformed and quantized 308 current block and therefore be represented by fewer transform coefficients in the video bitstream. Examples of block-based transforms include the Karhunen-Loéve Transform (KLT), the Discrete Cosine Transform ("DCT"), and the Singular Value Decomposition Transform ("SVD") to name a few. In one example, the DCT transforms the block into the frequency domain. In the case of DCT, the transform coefficient values are based on spatial frequency, with the DC or other lowest frequency coefficient at the top-left of the matrix and the highest frequency coefficient at the bottom-right of the matrix.

Transform and quantize stage 308 converts the transform coefficients into discrete quantum values, which can be referred to as quantized transform coefficients. Quantization can reduce the number of discrete states represented by the transform coefficients while reducing image quality less than if the quantization were performed in the spatial domain rather than a transform domain. The quantized transform coefficients can then entropy encoded by entropy encoding stage 310. Entropy encoding is a reversible, lossless arithmetic encoding scheme that can reduce the number of bits in the video bitstream that can be decoded without introducing change in the bitstream. The entropy-encoded coefficients, together with other information used to decode the block, such as the type of prediction used, motion vectors, quantizer value and filter strength, are then output as a compressed bitstream 322.

The reconstruction path in FIG. 3, shown by the dotted connection lines, can be used to help ensure that both encoder 300 and decoder 400 (described below with reference to FIG. 4) use the same reference frames to form intra prediction blocks. The reconstruction path performs functions that are similar to functions performed during the decoding process discussed in more detail below, including dequantizing and inverse transforming the quantized transform coefficients at inverse quantize and inverse transform stage 312, which can be combined with a residual block from mode decision stage 304 at adder 320 to create a reconstructed block. Loop filter stage 314 can be applied to the reconstructed block to reduce distortion such as blocking artifacts since decoder 400 can filter the reconstructed video stream prior to sampling it to form reference frames. FIG. 3 shows loop filter stage 314 sending loop filter parameters to entropy coder 310 to be combined with output video bitstream 322, to permit decoder 400 to use the same loop filter parameters as encoder 300, for example.

Other variations of encoder 300 can be used to encode compressed bitstream 322. Encoder 300 stages can be processed in different orders or can be combined into fewer stages or divided into more stages without changing the purpose. For example, a non-transform based encoder 300 can quantize the residual signal directly without transform stage. In another implementation, an encoder 300 can have transform and quantize stage 308 divided into a single stage.

Figure 4:
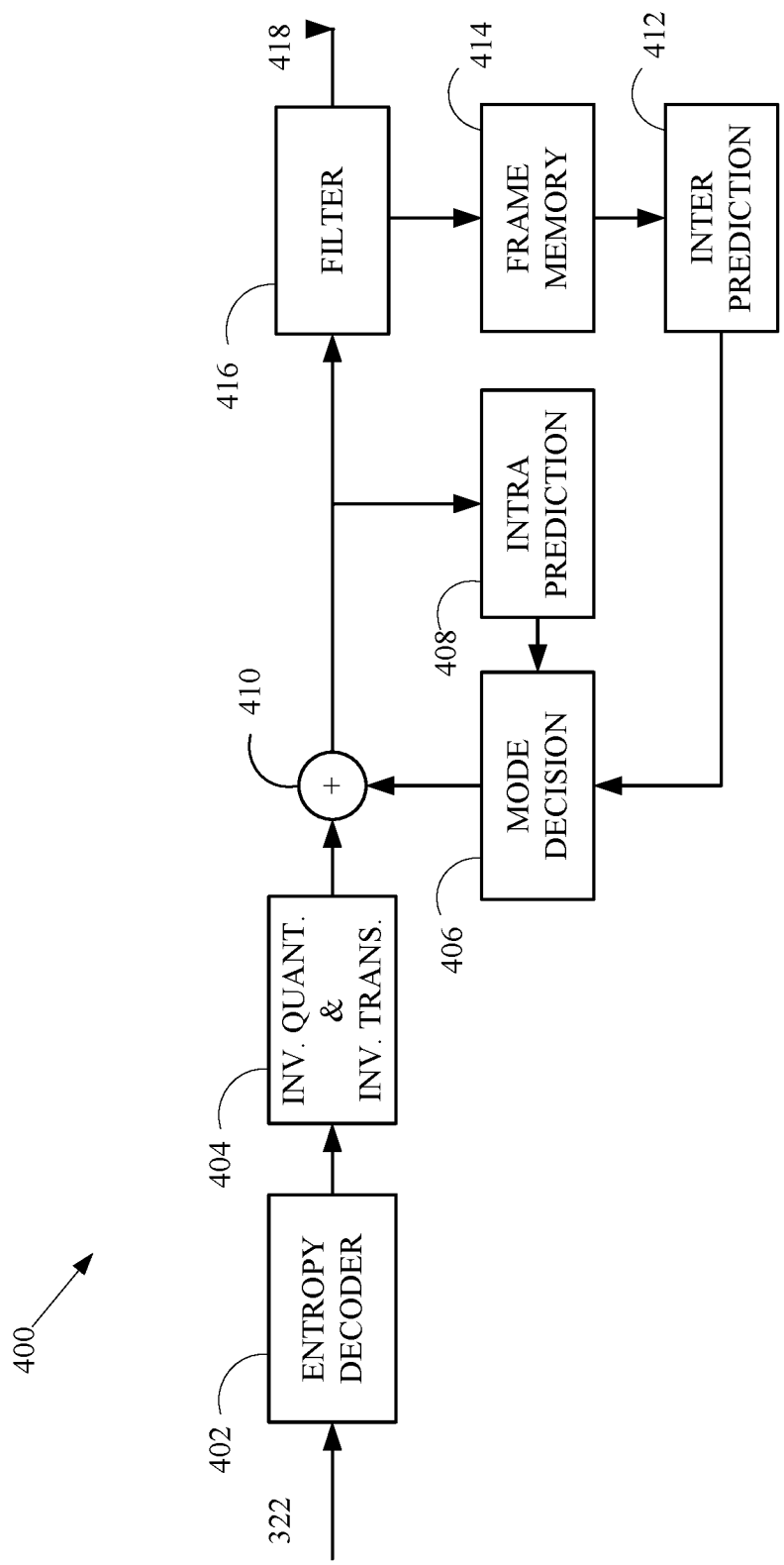
FIG. 4 is a block diagram of a video decompression system in accordance with implementations of this disclosure.

FIG. 4 is a block diagram of decoder 400 in according to disclosed implementations. In one example, decoder 400 can be implemented in computing device 14. Decoder 400 includes the following stages to perform various functions to produce an output video stream 418 from compressed bitstream 322: entropy decoding stage 402, an inverse quantization and inverse transform stage 404, an intra prediction stage 408, an inter prediction stage 412, an adder 410, a mode decision stage 406 and a frame memory 414. Other structural variations of decoder 400 can be used to decode compressed bitstream 322. For example, inverse quantization and inverse transform stage 404 can be expressed as two separate stages.

Received video bitstream 322 can be entropy decoded by entropy decoder 402. Entropy decoder 402 performs an inverse of the entropy coding performed at stage 310 of the encoder 300 to restore the video bitstream to its original state before entropy coding. The restored video bitstream can then be inverse quantized and inverse transformed in similar fashion to inverse quantize and inverse transform stage 312. Inverse quantize and inverse transform stage 404 can restore residual blocks of the video bitstream 322. Note that since encoder 300 and decoder 400 can represent lossy encoding, the restored residual block can have different pixel values than the residual block from the same temporal and spatial location in the input video stream 200.

Following restoration of residual blocks at inverse quantize and inverse transform stage 404, the residual blocks of the video bitstream can be then restored to approximate its pre-prediction state by adding prediction blocks to the residual blocks at adder 410. Adder 410 receives the prediction block to be added to residual blocks at stage 410 from the mode decision stage 406. Mode decision stage 406 can interpret parameters included in the input video bitstream 322 by encoder 300, for example, to determine whether to use intra or inter prediction to restore a block of the video bitstream 322. Mode decision stage 406 can also perform calculations on the input video bitstream 322 to determine which type of prediction to use for a particular block. By performing the same calculations on the same data as the decoder, mode decision state 406 can make the same decision regarding prediction mode as the encoder 300, thereby reducing the need to transmit bits in the video bitstream to indicate which prediction mode to use.

Mode decision stage 406 can receive prediction blocks from both intra prediction stage 408 and inter prediction stage 412. Intra prediction stage 408 can receive blocks to be used as prediction blocks from the restored video stream output from adder 410 since intra prediction blocks are processed in raster scan order, and since blocks used in intra prediction are selected by encoder 300 to occur in the raster scan order before the residual block to be restored occur, intra prediction stage 408 can provide prediction blocks when required. Inter prediction stage 412 creates prediction blocks from frames stored in frame memory 414 as discussed above in relation to encoder 200. Frame memory 414 receives reconstructed blocks after filtering by loop filter 418. Loop filtering can remove blocking artifacts introduced by block-based prediction techniques such as used by encoder 300 and decoder 400 as described herein.

Inter prediction stage 412 can use frames from frame memory 414 following filtering by loop filter 418 in order to use the same data for forming prediction blocks as was used by encoder 300. Using the same data for prediction permits decoder 400 to reconstruct blocks to have pixel values close to corresponding input blocks in spite of using lossy compression. Prediction blocks from inter prediction stage 412 are received by mode decision stage 406 can be passed to adder 410 to restore a block of video bitstream 322. Following loop filtering by loop filter 416, restored video stream 418 can be output from decoder 400. Other variations of decoder 400 can be used to decode compressed bitstream 322. For example, decoder 400 can produce output video stream 418 without loop filter stage 416.

Before making a real video or audio connection, it is very valuable to estimate the bandwidth available so that the encoder can encode using an appropriate bitrate. For example, initial bandwidth estimation can be done at the receiver side using a packet train. However, this estimation tends to be inaccurate. According to implementations of this disclosure, the bandwidth can be estimated jointly using both the sender and the receiver side data to improve accuracy.

Messages sent from a decoding device 14 to and encoding computing device 12 before or during transmission of a video bitstream 322 from encoding computing device 12 to decoding computing device 14 can be called back-channel messages. Disclosed implementations can use message (e.g., back channel messages) transmission and processing to determine network parameters associated with network bandwidth that can be used to optimize encoding parameters. FIGS. 5A-6D illustrate bandwidth estimation in more detail, as discussed below.

Figure 5A:
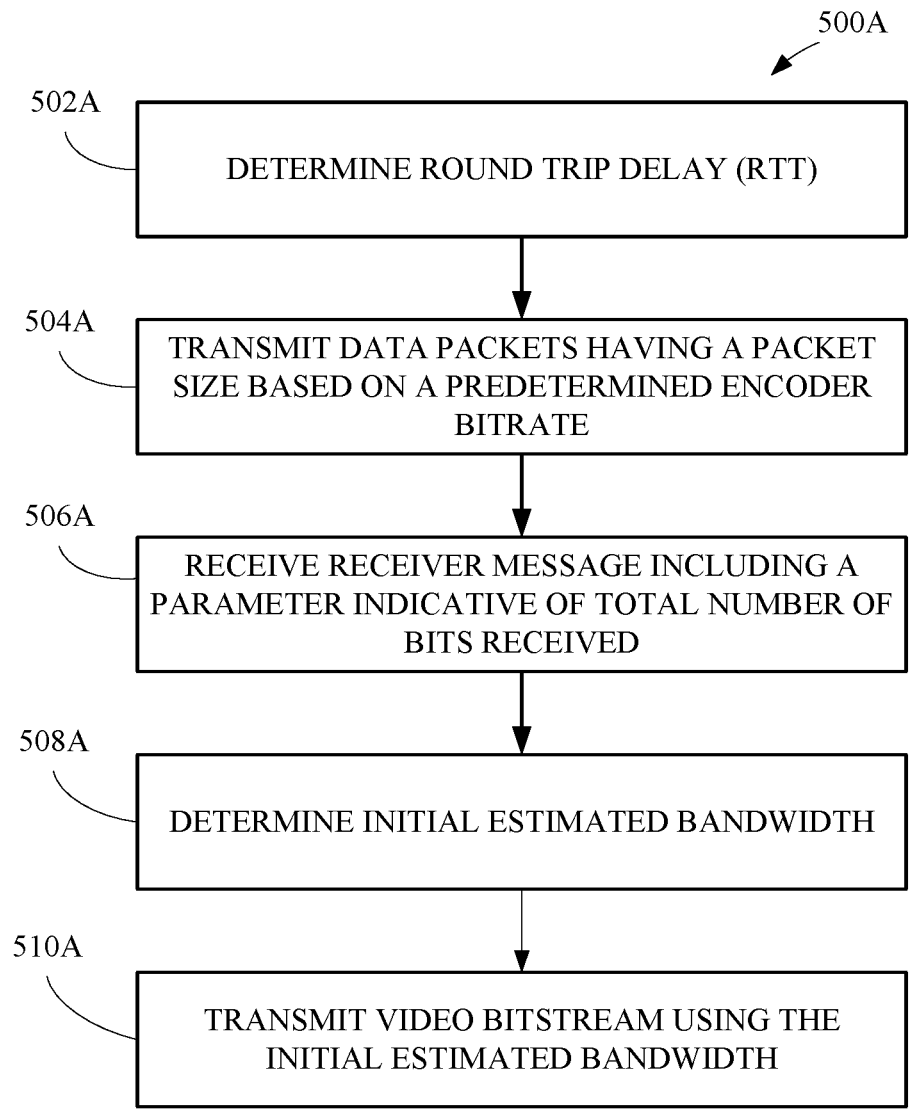
FIG. 5A is a flow diagram of an example process for estimating an initial bandwidth for transmitting a video bitstream in accordance with implementations of this disclosure.

FIG. 5A is a flow diagram of an example process 500A for estimating an initial bandwidth for transmitting a video bitstream in accordance with implementations of this disclosure. Process 500A can be performed by a sender such as an encoding computing device 12 (e.g., encoder 300) for example. The flowchart in FIG. 5A shows several operations included in process 500A. Process 500A can be accomplished with the operations included herein or with more or fewer operations than included here. For example, operations can be combined or divided to change the number of operations performed. The operations of process 500A can be performed in the order included herein or in different orders and still accomplish the intent of process 500A.

Process 500A can occur during a process of establishing a call between the sender (e.g., encoding computing device 12/encoder 300) and a receiver (e.g., decoding computing device 14 such as decoder 400), or after the call has been established, or at any other suitable stage (e.g., restart after the video has been interrupted for some time). A call can include, for example, one or more messages for establishing a video transmission connection between the sender and the receiver. The one or more messages can include, for example, Call and Answer messages exchanged between an encoding process and a decoding process, which will be described in details below in connection with the operations.

At operation 502A, the sender determines a round trip delay (RTT) between the sender and the receiver. For example, the sender can send a series of packets as Call messages to the receiver. Upon receipt of Call messages, the receiver can form Answer or acknowledgment (ACK) messages, which are formed into packets to be transmitted from the receiver to the sender, based on which the round trip delay can be determined as set forth in the following description.

For example, the sender can send some packets P(0), P(1), P(2) . . . to the receiver and record the timing of each of the packets sent as Ts(0), Ts(1), Ts(2) . . . . The packets sent can be, for example, small data packets such as Call messages. The receiver receives any one of the packets (e.g., P(0)) and acknowledges receipt to the sender (e.g., by sending one or more ACK messages). The sender, upon receiving any one of the acknowledgements (e.g. ACK messages), checks its timing Tr(0), Tr(1) . . . . The system round trip time/delay between sender and receiver can be calculated as the time difference between sending and receiving acknowledgement of the same-numbered packet, such as RTT=Tr(i)−Ts(i), where i=0, 1, . . . .

At operation 504A, starting from a first point in time (T0), the sender transmits a series of data packets having a packet size ("Psize" in bytes) based on a predetermined encoder bitrate.

The series of data packets can include, for example, data such as encoded video data, or packets artificially packed with random data. The data can include, for example, data for initial bandwidth estimation, and be transmitted as, for example, Call and Answer messages exchanged between an encoding process and a decoding process. Both Call and Answer messages can be sent by any of the devices. In the implementations involving packing encoded video data into the series of data packets (e.g., using process 500B in FIG. 5B), the encoded video bitstream can be encoded by computing device 12 using encoder 300 and transmitted via network 16, for example. On the receiver side, process 500C in FIG. 5C can be used to decode the data packets for bandwidth estimation, using decoder 400, for example.

For example, the sender can send a series of a total number of N plus K packets (indexed 0, 1, 2, . . . , N+K−1) with a packet size of Psize. Each packet is sent within a period of waiting time (Td). The maximum bandwidth that can be estimated is dependent on the packet size Psize and sending speed (1/Td). Assuming the timing of sending data packet 0 is T0, as soon as the packet index is greater than or equal to N, the receiver calculates the total bits ("Btotal") received based on the total number of packets received and the packet size.

As discussed above, the data for initial bandwidth estimation can include, for example, Call and Answer messages exchanged between an encoding process and decoding process 500. Here packets and messages are used interchangeably. For example, Call and Answer messages can be implemented as a series of packets that are "stuffed" with data for bandwidth estimation (the bandwidth estimation can occur either before the call establishment or after the call establishment). The data for bandwidth estimation can include, for example, "dummy" data, which can be random data in the form of padded Call messages, or "real" encoded video data such as the first video frame (often encoded as an "I frame"), the first several video frames, a user-defined collection of frames, and the "real" encoded video data can be transmitted at a time-interval that can be used to estimate the bandwidth.

For example, the Call and Answer messages can be out of band packets that accompany the encoded video bitstream, standalone data packets, or packets sent as part of the encoded video bitstream. Same or different message types can be used for initial bandwidth estimation and bandwidth adjustment later on, respectively.

Disclosed implementations can keep track of Call and Answer messages by assigning a unique packet number (also referred to as "sequence number") to each packet including the Call and/or Answer messages, starting with a certain number (e.g., zero) and increasing by one for each video stream. A timestamp can also be included in each packet, also starting at a certain number (e.g., 0) and increasing with certain time interval (e.g., 1 or several milliseconds) for each packet sent by computing devices 12 or 14. The messages can be sent as a series of data packets each having the sequence number and the timestamp, and in a size of Psize. Timestamps can be arrival timestamps or sending timestamps, depending on whether the sender or the receiver is calculating the timestamps. Psize can be determined using a predetermined (encoder) bitrate such as "Maxbitrate". "Maxbitrate" can be, for example, a predetermined maximum video bitrate, which can be pre-stored in a configuration file associated with process 500A (or 500B-D, 600A-D in the other examples) and retrieved when needed. Depending on the network conditions, "Maxbitrate" can be adjusted to indicate the maximum allowed bitrate for a video transmission.

In some implementations, Psize can be determined as a function of a predetermined encoder bitrate, where Psize increases when the predetermined encoder bitrate increases above a threshold. For example, Psize can be determined based on "Maxbitrate" according to the following rules:

if (Maxbitrate<=300 Kbps)
Psize=400;
else if (Maxbitrate<=1 Mbps)
Psize=600;
else
Psize=1200;

By setting Psize in this fashion, network bandwidth can be estimated prior to sending any Call and Answer messages, thereby preventing the Call and Answer messages from flooding the network by sending too many packets too quickly when the network is slow. The aim is to estimate the bandwidth without flooding the network for a long time. For example, when the network is very slow, it is undesirable to send too many packets too quickly. On the other hand, it is important to send packets quickly enough to determine the true bandwidth.

Network bandwidth can be estimated in the process of establishing a call. When the call is connected, the video encode can initially start encoding the video bitstream using the estimated bandwidth, thus avoiding unreasonable usage of the available network bandwidth. Call and Answer messages can be used to determine the true network bandwidth if sufficient number of packets including Call and Answer messages are sent by an encoding computing device 12 and received by a decoding computing device 14 via a network 16. Process 500A (or 500B-D, 600A-D in the other examples) can be designed to handle three times the desired bitrate in one direction, while not flooding the network too long for network bandwidth over 100 Kbps.

At operation 506A, at a second point in time (Tc), the sender receives from the receiver, a message including a parameter indicative of a total number of bits (Btotal) received by the receiver. Btotal can be determined, for example, based on packet size (Psize) and the sending speed (1/Td). In some implementations, the receiver can send more than one message (for error tolerance, message could be lost) with Btotal to the sender. The messages can be sent as, for example, back channel messages, as will be discussed further below (e.g., FIGS. 6B and 7). The sender receives any of the messages containing parameter Btotal and checks the current timing Tc.

In some implementations, Btotal can be determined by the receiver in response to receiving at least one data packet having a sequence number greater than or equal to a predetermined sequence number, without taking into account any data packet received after receiving the at least one data packet having the sequence number. This will be further explained in FIG. 5C. In one example, once the receiver receives any packet having a sequence number great than or equal to N, it will determine the total bits received without taking into account any other packets received afterwards. The number N can be set as any number between a minimum sequence number (e.g., 0) and a maximum sequence number (e.g., N+K−1) of the series of data packets.

At operation 508A, based on the received parameter, the first and second points in time, and the round trip delay, the sender determines an initial estimated bandwidth. In some implementations, the estimated bandwidth ("Best") can be calculated according to the following formula:

$$Best = Btotal/((Tc-T0)-RTT)$$

At operation 510A, the sender transmits a video bitstream using the initial estimated bandwidth to the receiver. The video bitstream can be, for example, encoded using the initial estimated bandwidth.

In some implementations, bandwidth estimation can be determined based on the video data and a predetermined bandwidth for audio can be added to the video channel.

In some implementations, once the bandwidth is estimated, the initial sender parameters in the configuration file can be re-calculated based on the available bandwidth and other parameters, such as initial packet loss rate and round trip time. For example, parameters such as adaptive coding length (AdaptiveCodingLength), FEC ratio (FEC_ratio), video encoder bitrate, resolution and frame rate can all be re-initialized based on the initial estimate. The initial estimate can include, for example, one or more of the following three parameters: (estimated) Bandwidth, PacketlossRatio and RTT.

In some implementations, the initial bandwidth estimation can be done during the call-answer period using the call-Answer messages (e.g., while the call is "ringing" and before the call is established). The call-Answer messages can be packetized with stuffing data by a pre-fixed size and timing information, so that the bandwidth can be estimated when the receiver receives these messages. The stuffing data can be generated, for example, by a random number generator to avoid network protocol compression.

With regard to the packet structure design, the packets containing Call and Answer messages can start with a sequence number and time stamp, and then be stuffed to the predetermined size with stuffing data. The stuffing data can be, for example, exactly Psize bytes (all data right after the Call/Answer message data). For example, the first two words of the stuffing data can be used for the sequence number and time stamp (e.g., in an unsigned int format).

In an illustrative example, the sequence number starts at "zero" and increases by one for every packet sent. The time stamps are also started from zero and the packets are timestamped at their respective sending time. Similar to the description above, there can be two groups of Call messages and two groups of Answer messages. The first group is composed of 25 identical packets while the second group is composed of ten packets.

In the illustrative example, two groups of Call and Answer messages can be generated by the sender. For example, the sender can send a train of N+k packets (sequence number 0, 1, 2, . . . N+K−1) with a size of Psize, N=25 and K=10.

A first group of 25 Call messages (e.g., 25 identical packets) can be created and sent by an encoding computing device 12 in an equal time space (roughly) in 100 ms. For networks with bandwidth higher than Maxbitrate, the network bandwidth can be estimated at Maxbitrate. Following the first group of 25 packets, encoding computing device 12 can delay, for example, for a period of time such as approximately 400 ms (greater than the difference in time in sending the packets) before sending a second group of 10 packets in approximately 100 ms (10 ms each). If the network bandwidth is low, it will take a longer time to transmit all the packets (a total of 35 in this example). For example, a 100 Kbps channel will take roughly one second to transmit the 35 packets at 400 bytes each, while the same channel will take roughly three seconds to transmit the 35 packets at 1200 bytes each. Choosing the right packet size can avoid longer delays.

Depending on the Psize (discussed above in the example as 400, 800 or 1200 bytes), a group of 25 packets sent out at approximately 100 ms intervals would represent a maximum bitrate of:

$$MaxBitrate = 25 \times 8 \times Psize/0.1 = \{0.8\ Mbps,\ 1.6\ Mbps,\ 2.4\ Mbps\}$$

In this example, it can be determined that the maximum bitrate that can be estimated using values of Psize are 0.8 Mbps, 1.6 Mbps or 2.4 Mbps. For any network with a higher bandwidth than the MaxBitrate, it will be only estimated at MaxBitrate.

The time it takes to transmit and receive the first and second groups of packets can be used to indicate the network bandwidth. For example, a 100 Kbps network can take approximately one second to transmit 35 packets included in the first and second groups, assuming 400 bytes (Psize=400) for each packet. At 1200 bytes (Psize=1200) the same network can take approximately three seconds. Transmitting and receiving Call and Answer message packets can take place at the beginning of a video stream, meaning that a user can be waiting until the Call and Answer messages are processed before the video begins.

In this example, the receiver can begin receiving and storing packets, when establishing the call or when the first video bitstream begins, and continue until packet sequence number N, which in this example is 25 (or any packet with a number more than 25), is received, or a time window has elapsed, such as three seconds. Any packets not received before the packet No. 25 or within the time window can be considered lost and will not be counted in the Btotal. In this example, the estimated bandwidth can be calculated by the following equation:

Bandwidth=(24−$N$loss)*$P$size/($T$last−$T$first)

Here Bandwidth is calculated in Kbps and Nloss is the total number of packets lost in the first N (e.g., 25) packets. This does not include any packets lost in the second groups of 10 packets. Tlast is the arrival timestamp of the last packet immediately before packet with sequence number 25, not including lost packets, which can be measured in ms, and Tfirst is the arrival time of the first packet received (it can be measured in ms). Note that the relative difference in arrival time from the first packet to the last packet is used to determine bandwidth, since the time required to transmit the first packet might not be known.

Figure 5B:
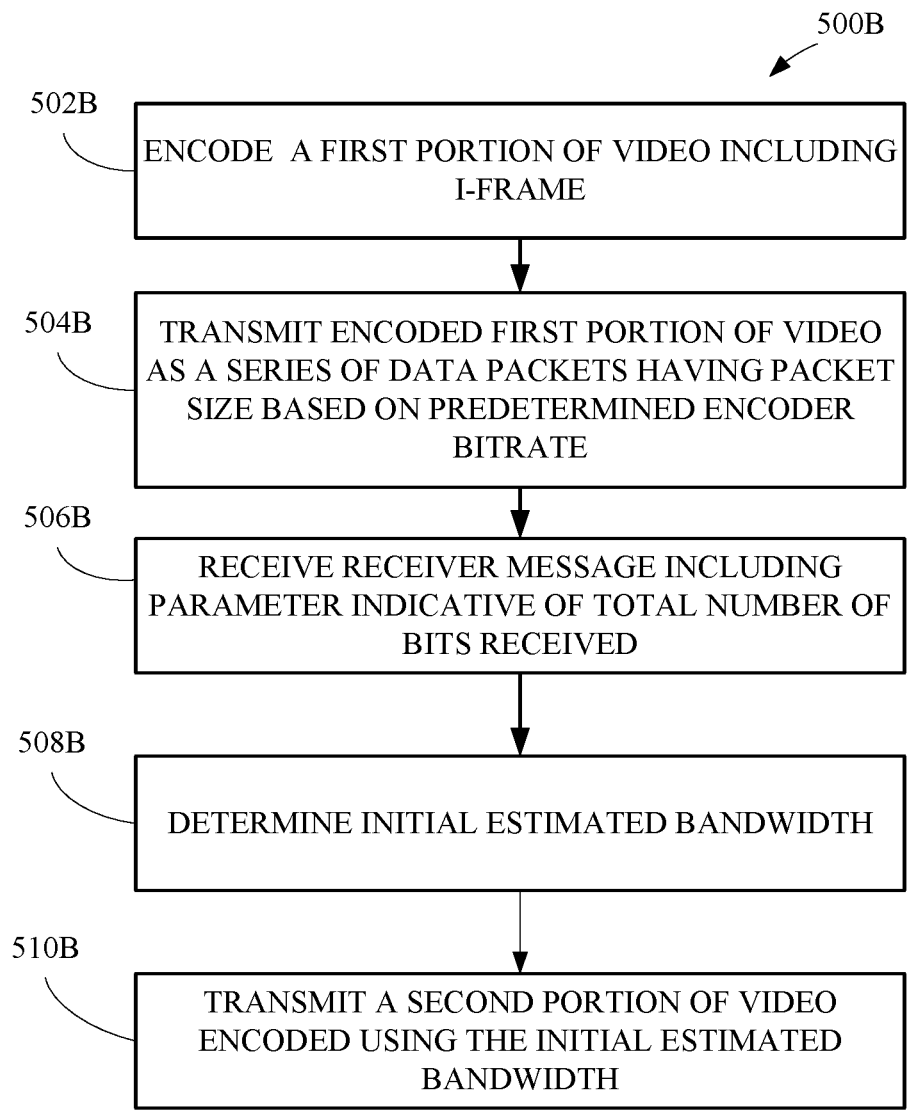
FIG. 5B is a flow diagram of another example process for estimating an initial bandwidth for transmitting a video bitstream in accordance with implementations of this disclosure.

FIG. 5B is a flow diagram of another example process 500B for estimating an initial bandwidth for transmitting a video bitstream by a sender, using real video data of the video bitstream in accordance with implementations of this disclosure. Those steps that are similar to the steps in FIG. 5A should be understood to include the descriptions in FIG. 5A.

At operation 502B, the sender encodes a first portion of the video bitstream, which can include, for example, a first frame such as an I-frame, and zero or more other frames (e.g., inter-predicted frames such as P frames, B frames or PB frames).

The video bitstream can be encoded by encoding computing device 12, for example and transmitted to decoding computing device 14, and the encoded bitstream can include a frame encoded using a selected reference frame from reference frames preceding the frame in display order. As will be discussed below, the reference frames can include a good reference frame. The good reference frame is a reference frame known to the encoder to be error-free. In some implementations, for a reference frame to be a good reference frame, the reference frames needed by it for decoding are also error-free.

At operation 504B, from a first point in time, the sender transmits the encoded first portion of the video bitstream as a series of video data packets having a packet size based on a predetermined encoder bitrate. For example, the sender can transmit one or more Call messages for establishing the call between the sender and the receiver.

At operation 506B, at a second point in time, the sender receives from the receiver, a message including a parameter indicative of a total number of bits received by the receiver (Btotal). The receiver receives the video bitstream packets, from the sender, which came from encoded first portion of the video bitstream transmitted as a series of data packets, and feeds this data into the decoder 400 for decoding. The receiver then sends messages (e.g., back channel messages such as Answer messages) to the sender, which can include, for example, parameter(s) such as Btotal. For example, the receiver can send one or more Answer messages in response to receiving the Call messages sent by the sender.

As discussed in FIG. 5A, the data packets (e.g., Call and Answer messages) sent by the sender or the receiver can each include a sequence number, a timestamp, etc. The receiver can determine parameters such as Btotal based on, for example, the total number of bits received by the receiver once the receiver receives a data packet having a sequence number greater than or equal to a predetermined sequence number, without taking into account any packets received afterwards.

In some implementations, the messages can also include good/bad reference data, as will be discussed below. For example, the good/bad reference data can indicate whether at least at least one frame decoded from the encoded first portion of the video bitstream is correctly decoded from a good reference frame. The messages can be, for example, back channel messages. The sender receives any of the messages containing parameter Btotal and checks the current timing Tc.

At operation 508B, based on the received parameter(s) (e.g., Btotal), the first and second points in time, and the round trip delay (not shown in FIG. 5B but shown in operation 502A of FIG. 5A) between the sender and the receiver, the sender determines an initial estimated bandwidth. This step is similar to operation 508A as described in FIG. 5A.

In some implementations, the received parameters can include the good/bad reference data, among others. For example, it can be determined, based on the good/bad reference data, whether the decoded first portion of the video includes at least one good reference frame. If so, a second portion of the video bitstream can be encoded using the at least one good reference frame and the initial bandwidth estimated by the sender. If there is no good reference frame, the encoder 300 (sender) can encode and resend the complete video bitstream using the initial bandwidth estimated by the sender, which includes both the first portion and the second portion of the video bitstream.

In some implementations, the selected reference frame can be selected from preceding reference frames, in display order, of the current frame. The preceding reference frames can include at least one good reference frame, defined as a reference frame, known to the encoder, that can be decoded free of error. For example, the selected reference frame can be a good reference frame, and that good reference frame can be used for encoding the current frame. For another example, the good reference frame as the selected reference frame can be used for encoding a number of consecutive frames including the current frame, in which case the number of consecutive frames encoded using the same good reference frame is adaptively selected based on one or more of the following data: packet loss rate, bandwidth data, and FEC strength. The FEC strength, for example, can be determined by a FEC encoder based on the received data for encoding video bitstream 322 from decoding computing device 14, and the FEC encoder can adaptively change the FEC strength and packet size based on the received data (e.g., feedback information). In some implementations, the encoding parameters determined in operation 704 can be updated based on one or more of the following data: FEC strength, bitrate, and the number of consecutive frames encoded using the same good references frame.

At operation 510B, the sender transmits a second portion of the video bitstream encoded using the initial estimated bandwidth. In some implementations, the sender can re-start the encoder based on the estimated bandwidth. If some pictures are decoded correctly in the decoder (as discussed above, based on the good/bad reference data included in the messages received from receiver), the sender can use that correct ("good") reference frame for prediction. But if there is no good picture for reference, the sender can re-start the coding from a key-frame.

In some implementations, the encoding computing device 12 (sender) can encode the second portion of the video bitstream using encoding parameters determined based on the Answer messages sent by decoding computing device 14 (receiver) in response to receiving a first portion of the video bitstream or some random data packets that are sent out of band (e.g., the examples in FIG. 5A). Encoding parameters can include parameters that can be input to the encoding process to adjust the resulting output bitstream with regard to bandwidth and error correction. For example, the encoding parameters can include, without limitation, bitrate, FEC ratio, reference frame selection and key frame selection. For another example, the encoding parameters can include estimated bandwidth determined based on the bandwidth data included in the aforementioned received data. Disclosed implementations can adjust the encoding parameters to match network bandwidth, packet loss ratio and round trip time and thereby optimize the encoding process to provide the highest quality decoded video at decoding computing device 14 for given network bandwidth, packet loss ratio and round trip time.

As discussed in FIG. 5A above, the series of data packets can be transmitted during a process of establishing a call between the sender and the receiver, or after a call has been established, or at any other stage, or at another time. Similarly, process 500C illustrative below can be performed, for example, during a process of establishing a call between the sender and the receiver, or after a call has been established between the sender and the receiver, or during a process of transmitting a video bitstream between the sender and the receiver.

Figure 5C:
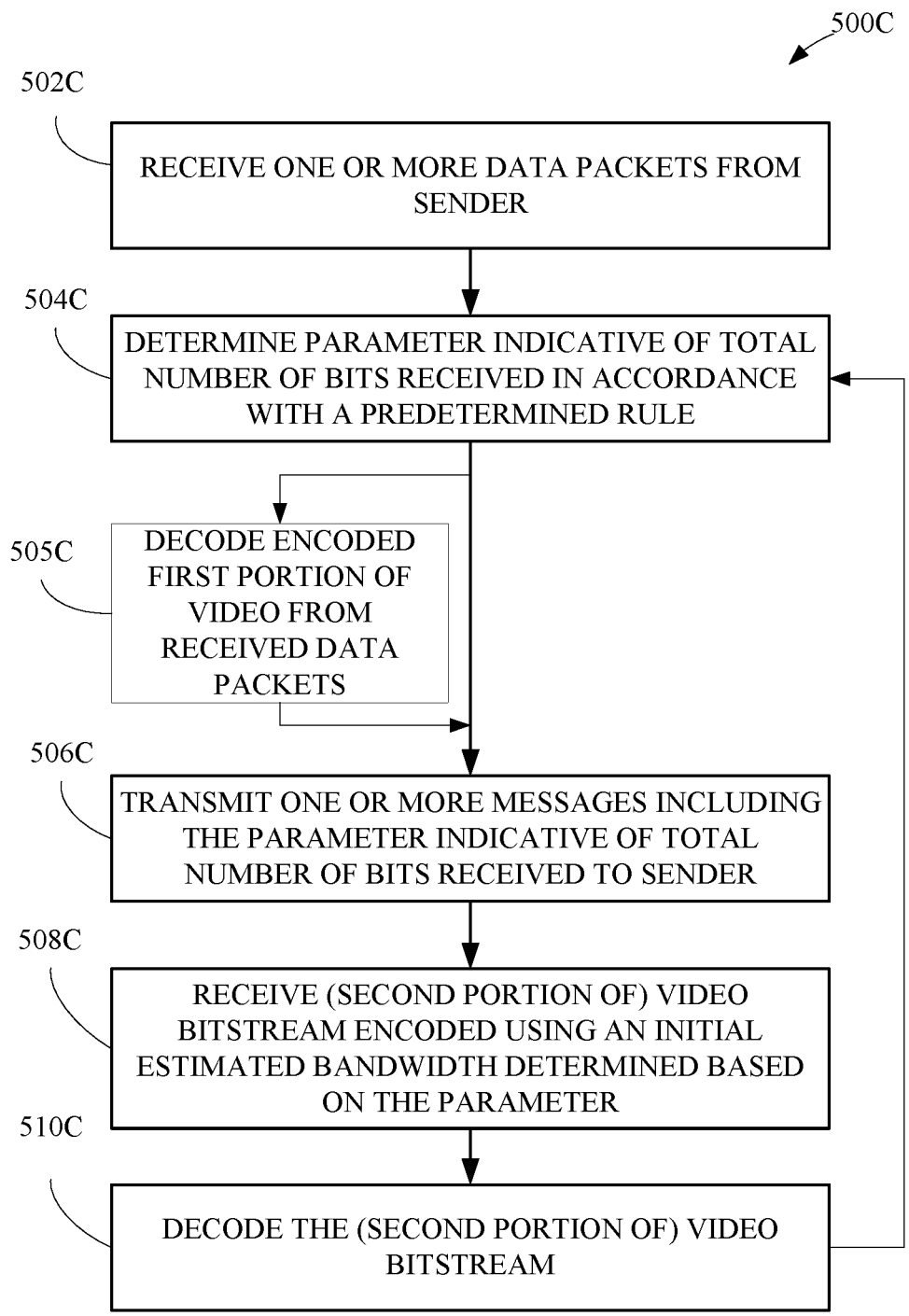
FIG. 5C is a flow diagram of an example process for estimating an initial bandwidth for receiving a video bitstream in accordance with implementations of this disclosure.

FIG. 5C is a flowchart of an example process 500C for estimating an initial bandwidth for receiving a video bitstream by a receiver in accordance with implementations of this disclosure. Process 500C can be performed by a decoding computing device 14 (e.g., decoder 400) for example. The flowchart in FIG. 5C shows several operations included in process 500C. Process 500C can be accomplished with the operations included herein or with more or fewer operations than included here. For example, operations can be combined or divided to change the number of operations performed. The operations of process 500C can be performed in the order included herein or in different orders and still accomplish the intent of process 500C.

Process 500C begins at operation 502C by receiving, by the receiver, one or more data packets associated with a series of data packets sent by the sender, which can be used for initial bandwidth estimation. By receiving we can mean inputting, acquiring, reading, accessing or in any manner receiving the data for initial bandwidth estimation. The received data for initial bandwidth estimation can include one or more data packets having a packet size Psize, which can be determined based on a predetermined encoder bitrate (e.g., maximum bitrate "Maxbitrate"), as described in FIG. 5A. In some implementations (e.g., implementations described in FIG. 5A), the one or more data packets can be data packets of stuffing data sent by the sender as a series of data packets. In other implementations (e.g., FIG. 5B), the one or more data packets can be associated with an encoded first portion of the video bitstream transmitted as a series of data packets by the sender.

At operation 504C, the receiver can determine parameters based on the received data for initial bandwidth estimation, in accordance with a predetermined rule. The parameters determined by the receiver are also called receiver-side (decoder-side) parameters. For example, the receiver-side parameters can include a parameter indicative of a total number of bits received (Btotal) by the receiver.

For example, process 500C can utilize the timing and size of received Call messages to determine receiver-side parameters (e.g., channel parameters). As discussed above, each Call message can be timestamped when it is created. In addition, process 500C can timestamp each packet with an additional timestamp indicating the time it was received and send back an Answer message with the receiving timestamp.

For the initial bandwidth estimation, as discussed previously in FIG. 5A, the receiver puts a timestamp on each packet when it is received (this receiving timestamp is the time when the packet arrives at the socket, and differs from the timestamp within the packet, which is the sending timestamp). Using the same illustrative example, when packet number 25 (or any packet number greater than 25) is received, or a maximum window (such as a predefined three-second window) is reached, the packets that did not arrive can be considered lost. The average bandwidth is calculated by the following rule:

Bandwidth=((25−1)−Nloss)*Psize/(Tlast−Tfirst); (in unit of K bps)

Where:
Nloss=the total number of packets lost in the first 25 packets (0 to 24). It does not include any losses in the last 10 packets (25-34);
Tlast=the arrival timestamp of the last packets immediately before packet 25 (excluding the lost packets). Unit: millisecond (ms)
Tfirst=the arrival timestamp of the first packet received. Unit: millisecond (ms)

In the above, the first packet is not counted for the bandwidth calculation because the time stamp is the arriving time, meaning that the packet has already arrived.

Optionally, in some implementations, if the one or more data packets at operation 502C are generated using the encoded first portion of the video bitstream (see, e.g., examples in FIG. 5B), at operation 505A, the receiver decodes the encoded first portion of the video bitstream from the one or more data packets.

At operation 506C, process 500C can transmit receiver-side parameters determined at operation 504C to the sender. The parameters can be transmitted in one or more messages each comprising the parameters such as Btotal. The network parameters can include bandwidth indicator, Tdacc, Rbitrate and Packetlossratio as described above or below. The network parameters determined at operation 504C can be transmitted to encoding computing device 12 via a back channel message. For example, the back channel messages can be sent by a back channel message manager 722 at a controller 708. Further details about controller 708 and back channel message manager 722 can be found in description below associated with FIG. 7.

In some implementations, more than one message (for error tolerance, message could be lost) including the parameter indicative of the total number of bits received (Btotal) can be transmitted to the sender. For example, process 500C can transmit Answer messages in packets using similar techniques as were used to transmit the Call message packets. For example, the receiver can pause until either, e.g., 25 packets have been sent or three seconds have elapsed. At this point, the decoding computing device can pause transmitting packets, and the encoding computing device 12 (sender or encoder 300) can determine network bandwidth and other parameters such as packet loss ratios using the received Answer message packets, for example. During the time that encoding computing device 12 is determining encoding parameters (such as initial estimated bandwidth) based on Answer messages, the encoding computing device can refrain from transmitting video bitstream data to the decoding computing device 14. During this time period the decoding computing device can remain in a ready state, ready to receive a video bitstream and decode it.

The receiver-side parameters can include, for example, a total number of bits received (Btotal), packet loss ratio, round trip delay, receiving bitrate, bandwidth data, data indicating whether a reference frame is good or bad, or any combination of the above. The transmitted receiver-side parameters can be used to determine encoding parameters by encoding computing device 12. Other data that purports such use is not limited to the description set forth herein.

For example, following a pause to permit the encoding computing device to determine network bandwidth, at operation 506C the decoding computing device 14 (receiver or decoder 400) can form Answer messages and create and transmit packets including Answer messages at certain intervals (e.g., at 10 ms intervals). Once the encoding computing device receives the Answer message packets and estimates network bandwidth and packet loss, encoding parameters can be re-calculated that reflect the available bandwidth (such as initial estimated bandwidth or adjusted bandwidth), packet loss rate and round trip time. Encoding parameters that can be re-calculated, at the sender, based on one or more of, for example, the estimated bandwidth, packet loss ratio, round trip time, adaptive coding length, FEC ratio, video encoder bitrate, spatial resolution (frame size), temporal resolution (frame rate) etc. Some of these parameters used for calculating estimated bandwidth can be determined by the sender, and some can be received from the receiver. It is also possible to use receiver-side parameters without using any sender-side parameters.

At operation 508C, the receiver receives, from the sender, a video bitstream encoded using an initial estimated bandwidth determined based on the parameter indicative of the total number of bits received. Other parameters that can be used include any of the parameters described above, such as, for example, Bandwidth, packet loss ratio, etc. In the implementations where the one or more data packets at operation 502C are generated using the encoded first portion of the video bitstream, the receiver can receive a second portion of the video bitstream, which is encoded using an initial estimated bandwidth determined by the sender based on the parameter indicative of the total number of bits received. As discussed above in FIG. 5B, when there is no good reference frame decoded from the first portion of the video bitstream, both the first and the second portions can be encoded and transmitted.

At operation 510C, operation 500C can decode the video bitstream of the video bitstream. Optionally, process 500C can go back to operation 504C to continue to determine network parameters based on received and decoded portions of the video bitstream 322, as discussed above. By determining network parameters from time to time (e.g., based on timestamps applied to the packets of portions of the video bitstream 322), changes in network bandwidth that can occur while portions of the video bitstream 322 are being received can be detected. For example, encoding computing device 12 can be a calling mobile phone in motion and decoding computing device 14 can be a receiving mobile phone also in motion and subject to changing network conditions including changes in network bandwidth.

Following operation 510C, if decoding computing device 14 is still receiving video bitstream 322 data, process 500C can return to operation 508C to receive the next video bitstream. If process 500C determines that no more video bitstream 322 data is being received at decoding computing device 14, process 500C can end.

In some implementations, as discussed above, a first portion of the video bitstream (e.g., "real" video data) encoded using the receiver-side parameters can be received from the encoder 300 by decoder 400, which then decodes the first portion of the video bitstream, and determines, using the controller 708, the receiver-side parameters associated with the first portion of the video bitstream. The receiver-side parameters can be transmitted, from the controller 708 to the encoder 300, as feedback information to control the encoder 300. The decoder 400 receives, from the encoder 300, a second portion of the video stream, in which the second portion of the video stream is encoded using the sender-side (encoder-side) parameters, and decodes the second portion of the video bitstream.

In some implementations, the initial bandwidth estimation can be performed during different stages of a call and using different types of data/information, including but not limited to, for example, real video data or data other than real video data ("stuffing data"), as discussed above.

In some implementations, separate messages can be created for transmitting the initial bandwidth estimation data and bandwidth estimation/adjustment data during the video sessions.

FIGS. 6A-6E show examples processes for bandwidth adjustments during the video bitstream transmission according to implementations of this disclosure. When encoding computing device 12 is transmitting the video bitstream 322 encoded with a bitrate determined from an estimated bandwidth that is higher than the actual bandwidth of the network, the network latency will increase. This can be identified by detecting network latency and the calculation of bandwidth from network latency can be relatively straightforward. Detection of actual bandwidth that is greater than the estimated bandwidth can be more difficult. Without reliable and efficient detection of actual bandwidth being greater than estimated bandwidth a decoder that dynamically detects network bandwidth can only go down in time and never (or less likely to) go back up.

Bandwidth detection can be based on the assumption that if bitrate (e.g., based on the estimated bandwidth) is greater than the available bandwidth, network latency will increase proportionally, while if estimated bandwidth is less than the available bandwidth, network latency will not increase. For example, if the bitrate is 200 Kbps and the available bandwidth is 100 Kbps, it will take two seconds to transmit one second of video, or some packets will have to be dropped. If the bitrate is 200 Kbps and the available bandwidth is greater than 200 Kbps, it will take one second to transmit one second of video. This can be determined by comparing timestamps included in the packets of a video bitstream 322 with local timestamps created when the video bitstream 322 is received at decoding computing device 14. The relative difference between corresponding timestamp can indicate if the maximum estimated bandwidth was reached.

Example implementations described below in FIGS. 6A-6E can adaptively respond to changes in network bandwidth both increasing and decreasing by detecting changes in network bandwidth from time to time while portions of the video bitstream are being transmitted at a rate that is high enough to maintain video quality despite changes in network bandwidth without decreasing bandwidth excessively by sending too many messages. Implementations can decrease bitrate when network bandwidth is detected decreasing and increase bitrate by a small amount when network latency is as estimated. In this way, by repeatedly sampling network bandwidth in the manner discussed above and adjusting encoding parameters, for example the encoding bitrate, by a small amount each time the network is performing as estimated, the maximum available bandwidth of the network can be determined in a relatively short period of time.

Figure 6A:
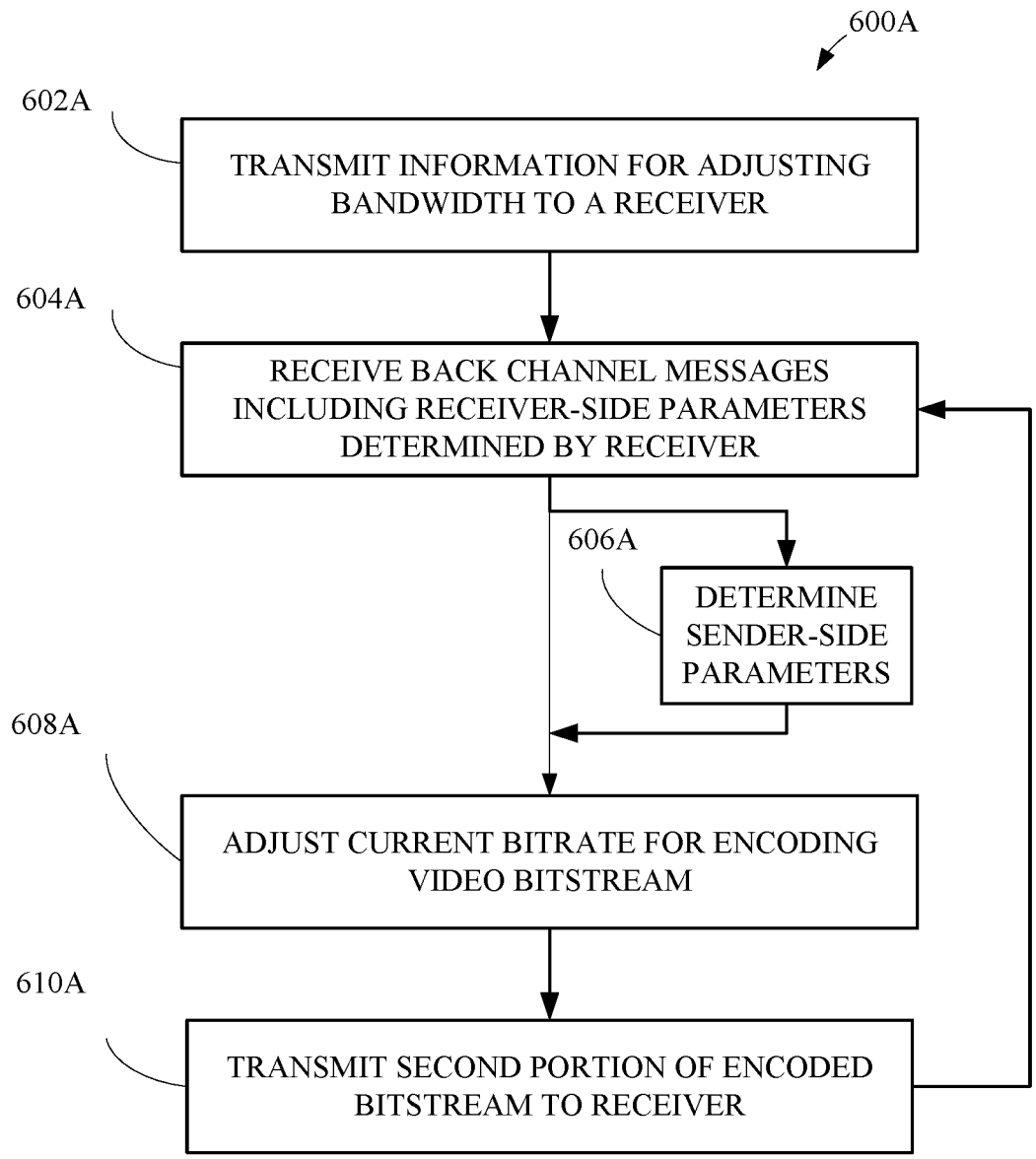
FIG. 6A is a flow diagram of an example process for adjusting bandwidth for transmitting a video bitstream in accordance with implementations of this disclosure.

FIG. 6A is a flow diagram of an example process 600A for bandwidth adjustment for transmitting a video bitstream to a receiver in accordance with implementations of this disclosure. Process 600A can be performed by an encoding computing device 12 (sender), for example. The flowchart diagram in FIG. 6A shows several operations included in process 600A. Process 600A can be accomplished with the operations included herein or with more or fewer operations than included here. For example, operations can be combined or divided to change the number of operations performed. The operations of process 600A can be performed in the order included herein or in different orders and still accomplish the intent of process 600A.

In some implementations, the bandwidth adjustment can use only receiver-side parameters determined by a receiver (e.g., decoder 400). In some implementations, the bandwidth adjustment can use both receiver-side and sender-side parameters.

At operation 602A a sender transmits information for bandwidth estimation to a decoding device (receiver). In some implementations, the sender can transmit a first portion of the video bitstream 322 encoded using a current bitrate and packetized as a series of data packets. For example, the Call messages can be transmitted as part of the video bitstream 322 and received by a decoding computing device 14. The decoding computing device can determine receiver-side parameters based on the received Call messages and send Answer messages back to the encoding computing device 12 via a back channel.

At operation 604A the sender can receive back channel messages including the receiver-side parameters determined by the receiver. For example, the received back channel messages can include receiver-side parameters determined by the receiver in response to receiving the series of data packets. For example, the receiver-side bandwidth parameters can include an accumulated time difference parameter (Tdacc), a received bitrate parameter, a packet loss ratio parameter, a bandwidth indicator parameter, a FEC ratio parameter, and/or data indicating whether a reference frame is good or bad, or any combination of the above. Data included in the received back channel messages can be used to determine encoding parameters by encoding computing device 12. Other data that purports such use is not limited to the description set forth herein.

In some implementations, the receiver-side parameters can include a good reference frame, or any reference frame can be chosen for encoding, depending on coding efficiency and bandwidth condition at the time. Encoding computing device 12 can switch between, for example, the different options of reference frames, and different number of frames in each group that use the same reference frame to better adjust to the current network condition based on the feedback information. Encoding parameters can include parameters that can be input to the encoding process to adjust the resulting output bitstream with regard to bandwidth and error correction. Examples of encoding parameters include, without limitation, bitrate, FEC ratio, reference frame selection and key frame selection.

In some implementations, the back channel message including the receiver-side parameters can be generated using the process shown in FIG. 6B, which will be described below.

Figure 6B:
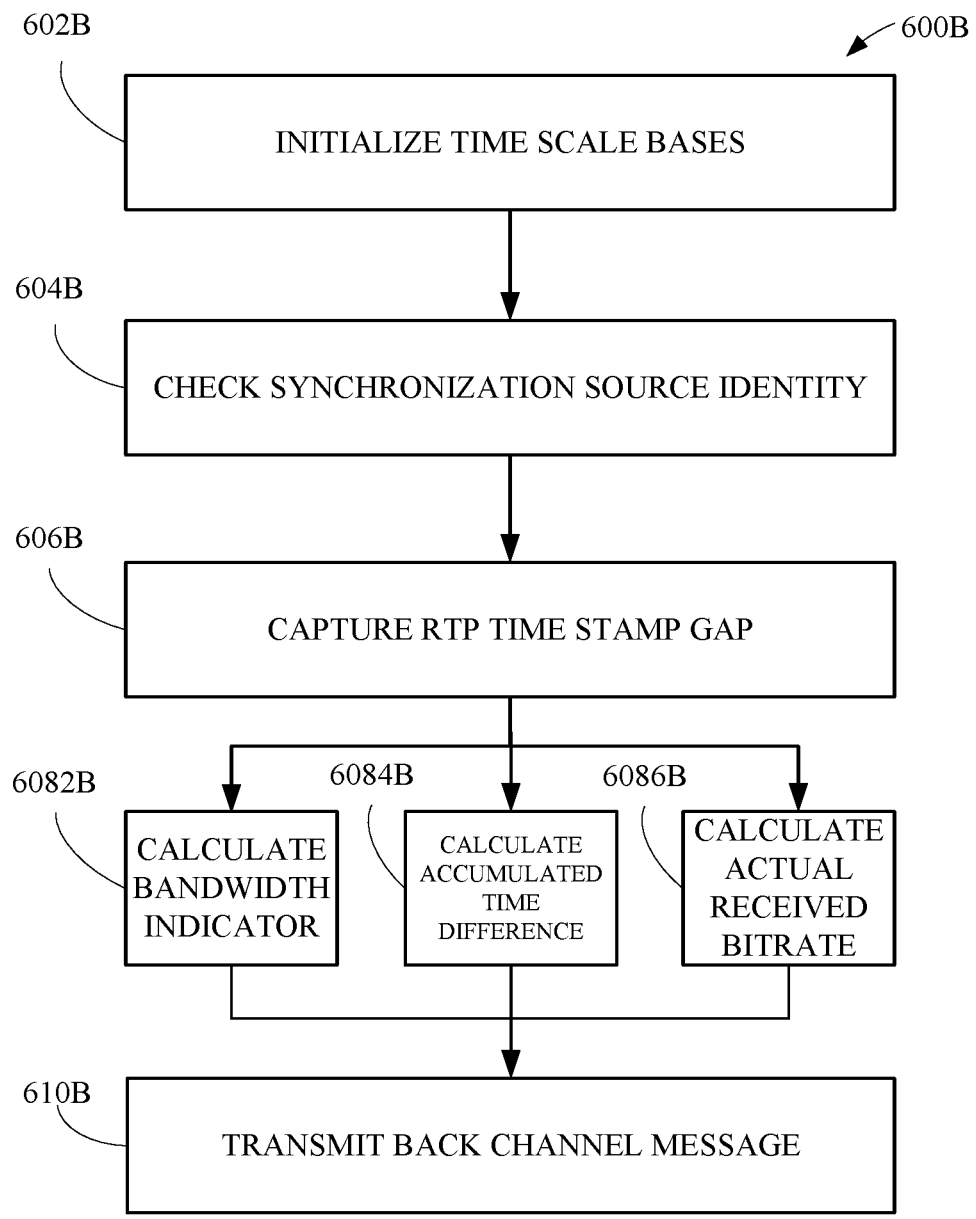
FIG. 6B is a flow diagram of an example process for generating a back channel message including receiver-side parameters for use by a sender in accordance with implementations of this disclosure.

FIG. 6B is a flow diagram of an example process 600B for generating a back channel message including receiver-side parameters for use by a sender to adjust encoding parameters in accordance with implementations of this disclosure.

Performing bandwidth estimation dynamically can be done using a sliding window based on local time at the decoding computing device 14. The window length can be two seconds or any other predetermined window length programmatically provided to process 600A. The illustrative process 600B begins, in operation 602B, with, when the first packet arrives (or triggered by its arrival) in the receiver socket, initializing the time scale bases. The time scale bases can be initiated as follows:

T0=the local time when the first packet was received (using the same scale)

Trtp0=the Real-time Transport Protocol (RTP) time stamp of the first video packet At operation 604B, the receiver checks the synchronization source identity (SSRC) of the first packet and last packet in the two-second window. If they are the same, then the operation continues with creating the bandwidth estimation message. Otherwise, the receiver resets the T0 and Trtp0 values to synchronize the first packet of the new SSRC—no message is sent (so the base of the RTP time stamp has changed too).

At operation 606B, the receiver captures the Real-time Transport Protocol (RTP) time stamp gap (Trgap) of the first packet and the last packet of the two-second window (in the local time of the receiver). Assume the time stamps for the first and last packet are, respectively, Tr0 and Tr1, then Trgap=Tr1−Tr0. With a 90K clock or a high precision timer, Twindow=2*90000 (converted to the same scale of the RTP time stamp).

One or more parameters such as the network bandwidth indicator, accumulated time difference, and received bitrate (Rbitrate) can be determined, by the receiver, at operations 6082B, 6084B, 6086B, respectively. Other parameters can also be determined at the receiver and included in the back channel messages to the sender.

A network bandwidth indicator ("bandwidth indicator") can be calculated by the receiver, in operation 6082B, as a function of Real-time Transport Protocol (RTP) time gap Tgap and the predetermined window time Twindow. In some implementations, a network bandwidth indicator can be calculated as a ratio of Twindow to Tgap, which can be used to indicate the current network conditions using the following rules:

| | |
|---|---|
| bandwidth indicator < 1: | The indicator would indicate network delay increase, caused by a network bandwidth shortage |
| bandwidth indicator = 1 | The indicator would indicate network is able to transmit the video without a problem. There potentially can be bandwidth for a higher bitrate |
| bandwidth indicator > 1 | The indicator would indicate arrival of a burst of packets faster than real time. This can be an indication of a network jam currently getting better. This can be the result, for example, a file download being stopped or a bandwidth limiter being released. The arrival of a burst of packets can also indicate an excessively jittery network condition. For most network jitter conditions, the bandwidth indicator will be close to 1 |

At operation 6084B, an accumulated time difference (Tdacc) in RTP time and local time can be determined as follows:

$$Tdacc=(Tr1-Trtp0)-(Tcurrent-T0)$$

Where:
Tr1=the time stamp of the last packet of the current window,
Trtp0=the time stamp of the first packet of the whole sequence with the same SSRC
Tcurrent=the current local time
T0=the local time when the first packet was received A continuous increase in the accumulated timer difference Tdacc indicates that the network bandwidth is not enough to transmit the bitstream. This can be used to correct, for example, the two-second window adjustment where a small delay increase cannot be detected.

At operation 6086B, the actual received bitrate (Rbitrate) can be calculated as the total bits received in all the packets (including FEC packets) in this window divided by the local time duration of this window (two-seconds in the present example).

In addition, the total number of packets (Ptotal) and the total number of lost packets (Plost) can be obtained by examining packet sequence numbers, for example, by subtracting the first RTP sequence number from the last RTP sequence number and comparing this to a count of packets received, for example. Ptotal and Plost can be used to determine Packetlossratio.

At operation 610B, the back channel message can then include one or more of the following parameters in the same message: BandwidthIndicator, Tdacc, Rbitrate, and Packetlossratio. This backchannel message can then be sent to the sender/encoder and utilized in a manner described in the U.S. patent application Ser. No. 14/867,143, filed Sep. 28, 2015, ("the '143 Application"), which is herein incorporated in its entirety by reference, to set parameters in the sender/encoder.

Back to FIG. 6A, optionally, at operation 606A, process 600A can determine sender-side parameters. Upon receiving the back channel messages from decoding computing device 14, for example, encoding computing device 12 can analyze the back channel messages and, in combination with other messages and stored parameters including statistics, can determine sender-side parameters to be used in encoding the second portion of the video bitstream 322. In some implementations, the sender can determine the sender-side parameters, such as round trip delay data, based on a sender-side time stamp difference of sending and receiving of the series of data packets as described in operation 502A.

Operation 606A can be skipped when only the receiver-side parameters are used for bandwidth adjustment. In those implementations, the sender will adjust the current bitrate (bandwidth) based on the receiver-side parameters. The receiver-side parameters can include, for example, one or more of the parameters discussed above, such as the Tdacc, Btotal, Rbitrate, bandwidth indicator, FEC ratio, packet loss ratio etc.

At operation 608A, the sender adjusts the current bitrate for encoding the video bitstream. In some implementations, the adjustment can be only based on the received receiver-side parameters as described in operation 604A. In some implementations, the adjustment can be based on both the received receiver-side parameters and the sender-side parameters determined by the sender, such as the receiver-side bandwidth indicators and the roundtrip delay data, as described in operation 606A. An example of adjusting encoding parameters, such as the current bitrate for encoding the video bitstream, using only receiver-side parameters, is shown by process 600C in FIG. 6C.

Figure 6C:
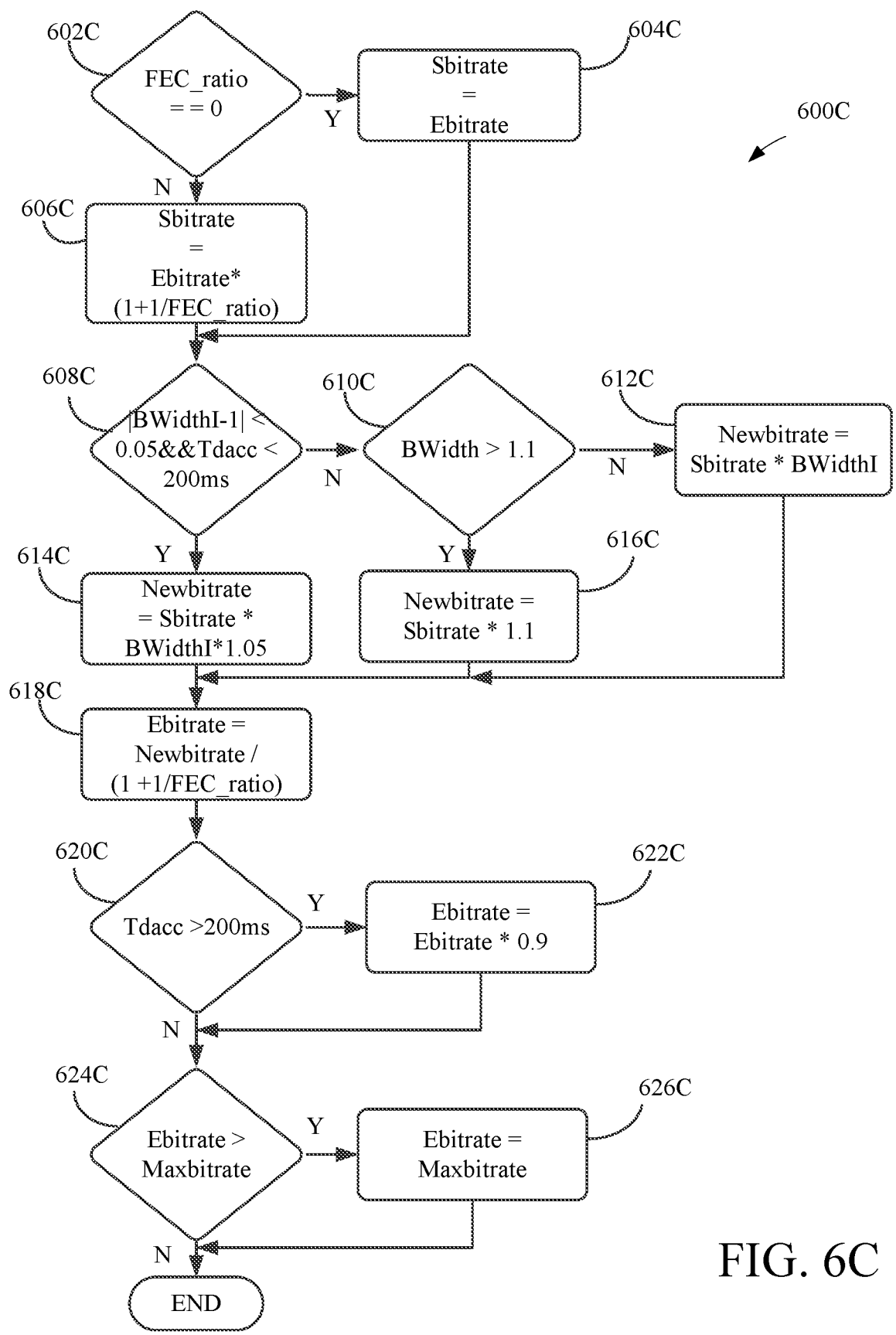
FIG. 6C is a flow diagram of an example process for adjusting bandwidth for transmitting a video bitstream in accordance with implementations of this disclosure.

FIG. 6C is a flow diagram of an example process 600C for adjusting a (current) bitrate for encoding a video bitstream in accordance with implementations of this disclosure. The current bitrate can be adjusted dynamically based on parameters described in, for example, processes 500A-500C, and 600A-B. Process 600C can be performed by an encoding computing device 12, for example. The flow diagram in FIG. 6C shows several operations included in process 600C. Process 600C can be accomplished with the operations included herein or with more or fewer operations than included here. For example, operations can be combined or divided to change the number of operations performed. The operations of process 600C can be performed in the order included herein or in different orders and still accomplish the purpose of process 600C.

As discussed above, FEC is an error correction technique that adds additional packets to the packets of a video bitstream to permit a receiver to recover lost or corrupted packets without requiring retransmission of the packet data. Each packet of the output video bitstream can be protected by zero or more packets of FEC data, e.g. a packet of the output video bitstream can be either unprotected by FEC packet data or protected by multiple FEC packets depending upon the predetermined importance of the packet in decoding the video bitstream. For example, packets including motion vectors can be protected by more FEC packet data than coefficients representing pixel data for an intermediate frame. The process of protecting the packets of a video bitstream using FEC packets can be controlled by several parameters, such as, for example, a "FEC_ratio" parameter, which describes the ratio between video bitstream data packets and FEC packets.

Process 600C begins at operation 602C with the assumptions that FEC_ratio is set to the current value being used to protect the current video bitstream 322, the current encoder bitrate is set to Ebitrate and the predetermined maximum bitrate permitted is Maxbitrate.

At operation 602C, process 600C tests FEC_ratio to see if it is 0, and if so, at operation 604C sets the variable Sbitrate=Ebitrate.

At operation 606C, if FEC_ratio is not equal to 0, Sbitrate=Ebitrate(1+1/FEC_ratio). This has the effect of incrementing the current bitrate proportional to the amount of FEC protection.

At operation 608C a network bandwidth indicator (also referred to as "network bandwidth" or "BWidthI"), which is received, is normalized to 0 and tested to see if it is less than a small value (e.g., 0.05) and that the received network parameter current accumulated time difference (Tdacc) is also less than a value (e.g., 200 ms), for example.

If these conditions are all met (e.g., both "true"), the network is handling the current bitrate, therefore at operation 614C process 600C can increase the estimated bitrate by about a small percentage (e.g., 5%) by setting the variable Newbitrate=Sbitrate*BWidthI*1.05.

If the test at operation 608C is false, at operation 610C bandwidth indicator BWidthI is tested to see if it is greater than 1.1 and if so, the network can be on a fast burst as discussed above, and therefore at operation 616C process 600C can probe the network to see if this means the network bandwidth has increased by setting the variable Newbitrate to Sbitrate*1.1, a 10% increase in bitrate.

If at operation 610C it is determined that BWidthI<1.1, the network delay is increasing, therefore at operation 612C the bitrate is adjusted down by setting Newbitrate=Sbitrate*BWidthI.

At operation 618C the estimated bitrate Ebitrate is set to be Newbitrate/(1+1/FEC_ratio) to compensate for the additional bits to be added to the bitstream by FEC.

At operation 620C the accumulated delay is tested to see if it is greater or equal to its estimated value of 200 ms.

If it is, then at operation 622C the network delay is increasing and the estimated bitrate Ebitrate is set to 90% of its value.

If at operation 620C the network delay is less than its estimated value, at operation 624C Ebitrate is checked to see if it is greater than the permitted maximum Maxbitrate. If so, at operation 626C it is reduced to be equal to Maxbitrate.

Following these operations the process 600C can return to operation 608A of FIG. 6A to complete process 600A.

With adjusted encoding parameters such as adjusted bitrate (based on bandwidth estimation), process 600A can encode a second portion of video bitstream 322 (not shown). In some implementations, encoding computing device 12 determines a selected reference frame for encoding a current frame of video bitstream 322. In some implementations, the selected reference frame can be selected from preceding reference frames, in display order, of the current frame. The preceding reference frames can include at least one good reference frame, defined as a reference frame, known to the encoder, that can be decoded free of error. For example, the selected reference frame can be a good reference frame, and that good reference frame can be used for encoding the current frame. For another example, the good reference frame as the selected reference frame can be used for encoding a number of consecutive frames including the current frame, in which case the number of consecutive frames encoded using the same good reference frame is adaptively selected based on one or more of the following data: packet loss rate, bandwidth data, and FEC strength. The FEC strength, for example, can be determined by a FEC encoder based on the received data for encoding video bitstream 322 from decoding computing device 14, and the FEC encoder can adaptively change the FEC strength and packet size based on the received data (e.g., feedback information). In some implementations, the encoding parameters determined in operation 704 can be updated based on one or more of the following data: FEC strength, bitrate, and the number of consecutive frames encoded using the same good references frame. In some implementations, the current frame of video stream 322 is encoded using the selected reference frame and the encoding parameters. In some implementations, the encoding process can be set forth in the following description.

For example, a first portion of video bitstream 322 can be encoded and transmitted as part of video bitstream 322 and received by decoding computing device 14. Decoding computing device 14 can determine receiver-side parameters based on the received messages and send messages back to the encoding computing device 12 via a back channel (e.g., back channel messages). Encoding computing device 12, for example, can receive the receiver-side parameters and calculate adjusted encoding parameters, then encode a second portion of video bitstream 322 with the determined next encoding parameters. The second portion of the video bitstream can be encoded using encoding parameters based on the receiver-side parameters, and optionally sender-side parameters. After being encoded, the second portion of video bitstream 322 can be transmitted by encoding computing device 12 via network 16 to decoding computing device 14. Decoding computing device, for example, can determine receiver-side parameters and send the determined receiver-side parameters back to encoding computing device 12 via back channel messages.

At operation 610A, the sender transmits a second portion of the video bitstream encoded using adjusted encoding parameters such as the adjusted current bitrate to the receiver. In some implementations, process 600A can continue by going back to operation 604A to receive next back channel messages for next adjustment of the bandwidth, until the video stream stops being transmitted.

Still at FIG. 6A, by going back to operation 604A, the sender can determine if additional adjustment of bandwidth is needed based on the received back channel messages including the receiver-side parameters. If true, process 600A can continue to the optional operation 606A to determine next sender-side parameters as in the case both receiver-side and sender-side parameters being needed for the bandwidth adjustment, or process 600A can continue to operation 608A for next bandwidth adjustment as in the case only receiver-side parameters being needed for the bandwidth adjustment. As discussed above, the frequency with which encoding parameters are determined will determine how smoothly and quickly process 600A can respond to changes in network bandwidth, while not decreasing network bandwidth significantly by adding back channel messages. If process 600A determines that no further video stream data remains, process 600A can end.

In some implementations, encoding computing device 12 (sender) can, for example, switch between using a known good reference frame and using any reference frame (e.g., the frame immediately preceding the current frame) for encoding a current frame of the video bitstream 322. The selection can be based on, for example, tradeoffs between coding efficiency and quality. For example, when selecting any reference frame (e.g., the frame immediately preceding the current frame), better coding efficiency is achieved but the decoded video can have lower quality due to errors occurred during transmission.

Figure 6D:
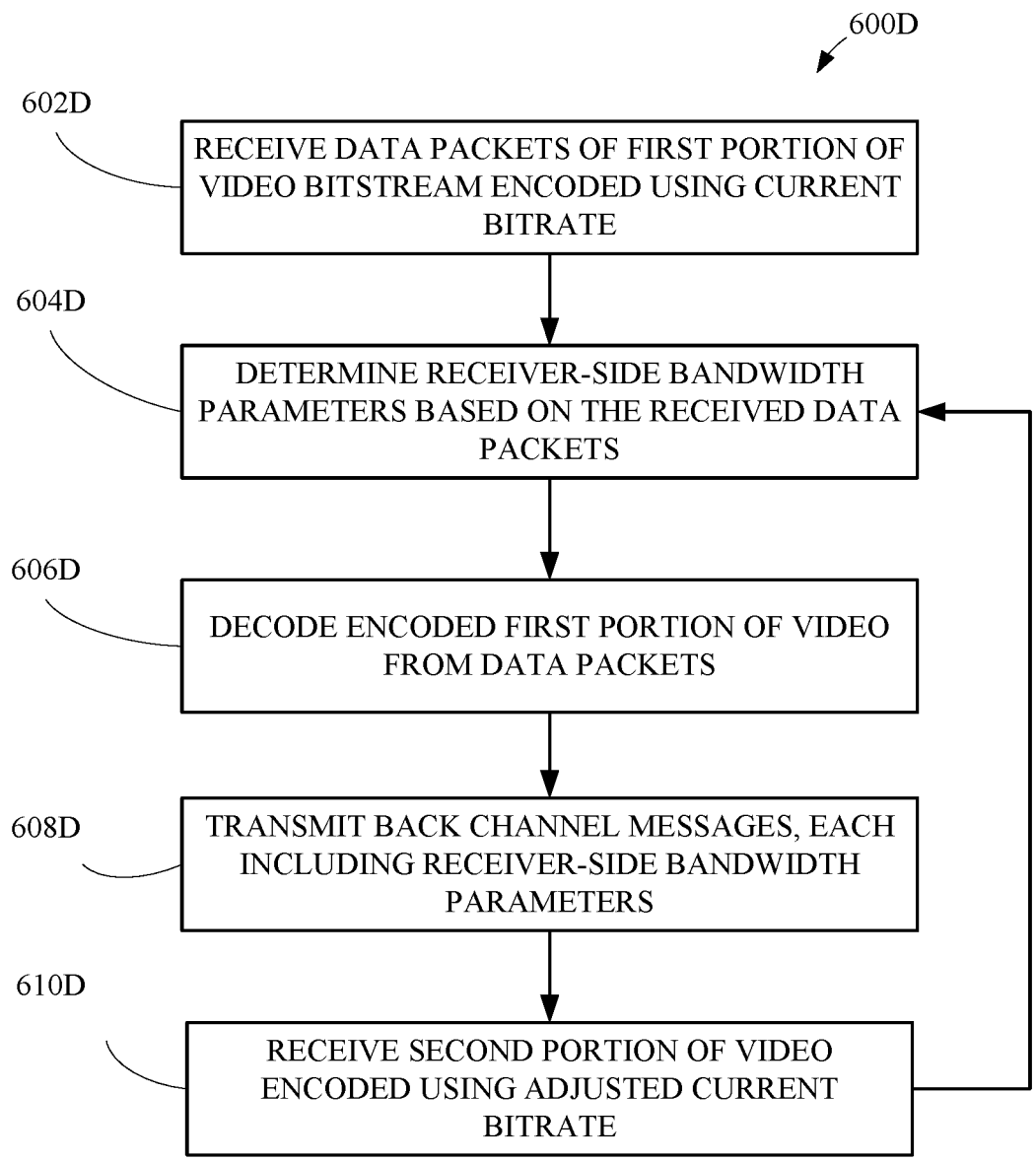
FIG. 6D is a flow diagram of an example process for adjusting bandwidth for receiving a video bitstream in accordance with implementations of this disclosure.

FIG. 6D is a flow diagram of an example process for adjusting bandwidth for receiving a video bitstream, by a receiver, in accordance with implementations of this disclosure. The bandwidth adjustment process is similar to the description in FIGS. 6A-C above, and our description focuses on the actions performed by the receiver. Process 600D includes operations 602D-610D that corresponds to operations 602A-610A in process 600A.

At operation 602D, a receiver receives one or more data packets associated with a first portion of the video bitstream encoded using a current bitrate and transmitted as a series of data packets. In some implementations, the one or more data packets can be transmitted by the sender in operation 602A.

At operation 604D, the receiver determines receiver-side bandwidth parameters based on the received one of more data packets. In some implementations, if receiver-side parameters are the only information used in the bandwidth adjustment, the receiver-side bandwidth parameters can include, for example, an accumulated time difference parameter, a received bitrate parameter, a packet loss ratio parameter, a bandwidth indicator parameter, and a FEC ratio parameter.

At operation 606D, the receiver decodes the encoded first portion of the video bitstream from the one or more data packets.

At operation 608D, in response to receiving the one or more data packets, the receiver transmits to the sender one or more back channel messages, which include the receiver-side bandwidth parameters.

At operation 610D, the receiver receives, from the sender, a second portion of the video bitstream encoded using an adjusted current bitrate. In some implementations (see, e.g., FIG. 6A), the adjusted current bitrate can be determined by the sender, in response to receiving the one or more back channel messages, based on the receiver-side bandwidth parameters. In some other implementations (see, e.g., FIG. 6E), the adjusted current bitrate can be determined by the sender, in response to receiving the one or more back channel messages, based on the receiver-side bandwidth parameters and sender-side data determined in response to receiving the one or more back channel messages.

In some implementations, after operation 610D, process 600D can continue by going back to operation 604D to determine next receiver-side bandwidth parameters based on received data packets of the second portion of video until the video stops being transmitted.

In some implementations, due to the fact that both audio and video will occupy the same bandwidth, the dynamic bandwidth estimation can be based on the video channel only, and an audio channel bandwidth Abandwidth can be pre-fixed at e.g., a rate of 100 Kbps. Therefore, the back channel message for bandwidth can be used to reference the video channel bandwidth only (which is set to zero if the bandwidth is less than the audio channel bandwidth).

$$Vbandwidth = Bandwidth - Abandwidth;$$

Vbandwidth is the parameter in the back channel messages to control the encoder/receiver parameter settings.

Figure 6E:
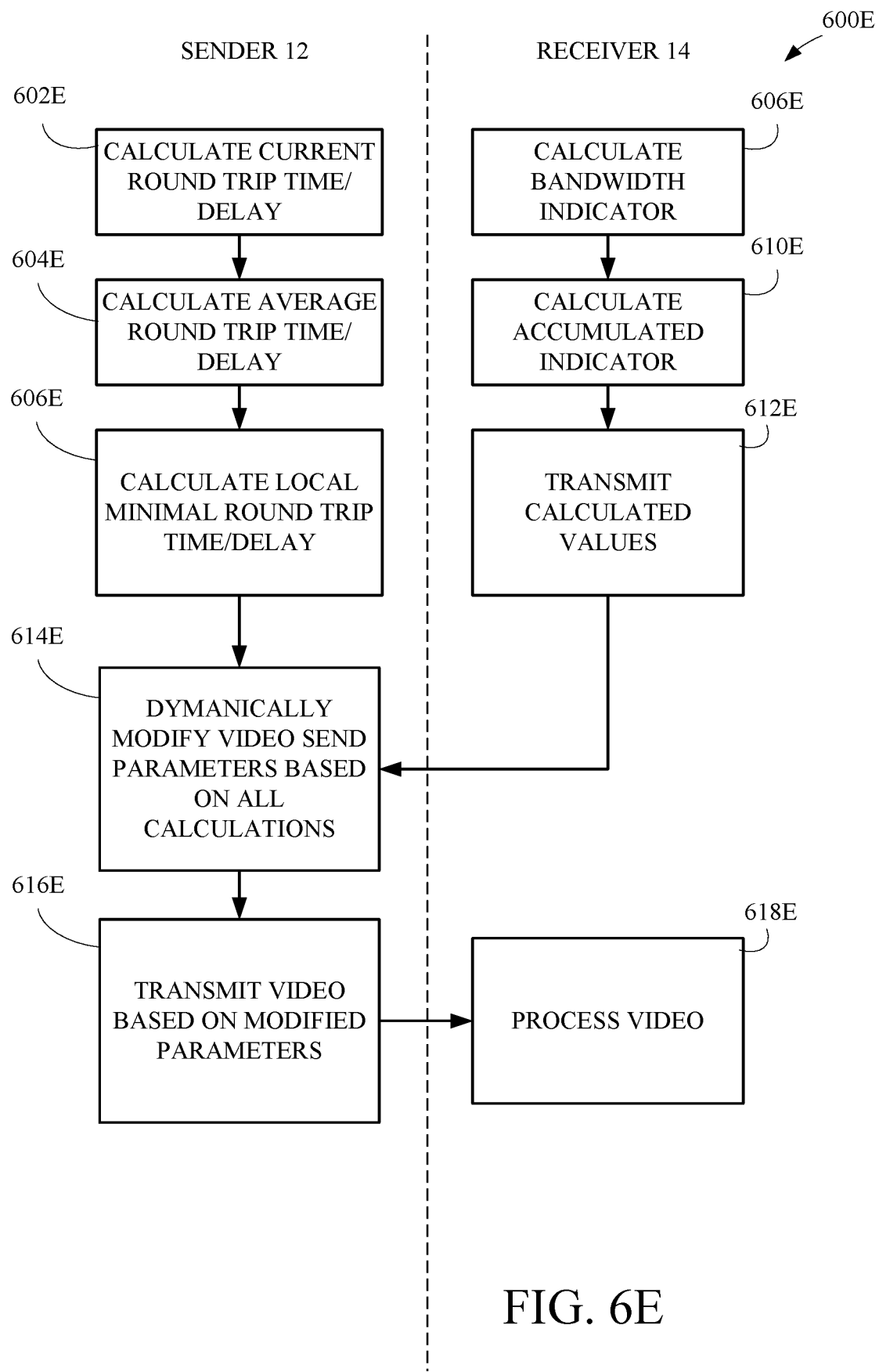
FIG. 6E is a flow diagram of an example process for adjusting bandwidth for transmitting and receiving a video bitstream in accordance with implementations of this disclosure.

FIG. 6E is a flow diagram of an example process 600E for bandwidth adjustment for transmitting and receiving a video bitstream in accordance with implementations of this disclosure. Process 600E illustrates a dynamic bandwidth adjustment process 600E involving both a sender (e.g., encoding computing device 12) and a receiver (e.g., decoding computing device 14).

During the video session, the network conditions (including bandwidth) can change and the sender needs to adjust encoding bitrate dynamically. This example uses both sender side information and receiver side information for making the adjustments.

The sender calculates, for example, a current round trip time/delay (CurrentRTT) at operation 602E, an average round trip time/delay (AverageRTT) at operation 604E, and a local minimal round trip time delay (LocalminimalRTT) at operation 606E, using the packet sending timing and acknowledgement timing as described above. LocalMinimalRTT is the minimal RTT in the call session during a period of time until it is reset when certain conditions are met (e.g., a minimal bitrate reached, etc.).

The receiver calculates, for example, a bandwidth indicator BandwidthIndicator at operation 608E, and an AccumulatedIndicator (Tdacc) at operation 610E, as discussed above. The BandwidthIndicator and the AccumulatedIndicator can be sent in a message from the receiver side to the sender side through back channel messages at operation 612E. The values calculated by both the sender and the receiver can be used to dynamically modify the sending parameters at operation 614E. Video bitstream is then sent from the sender to the receiver, based on the modified parameters at operation 616E, and the video signal is then processed at operation 618E by the receiver.

Figure 7:
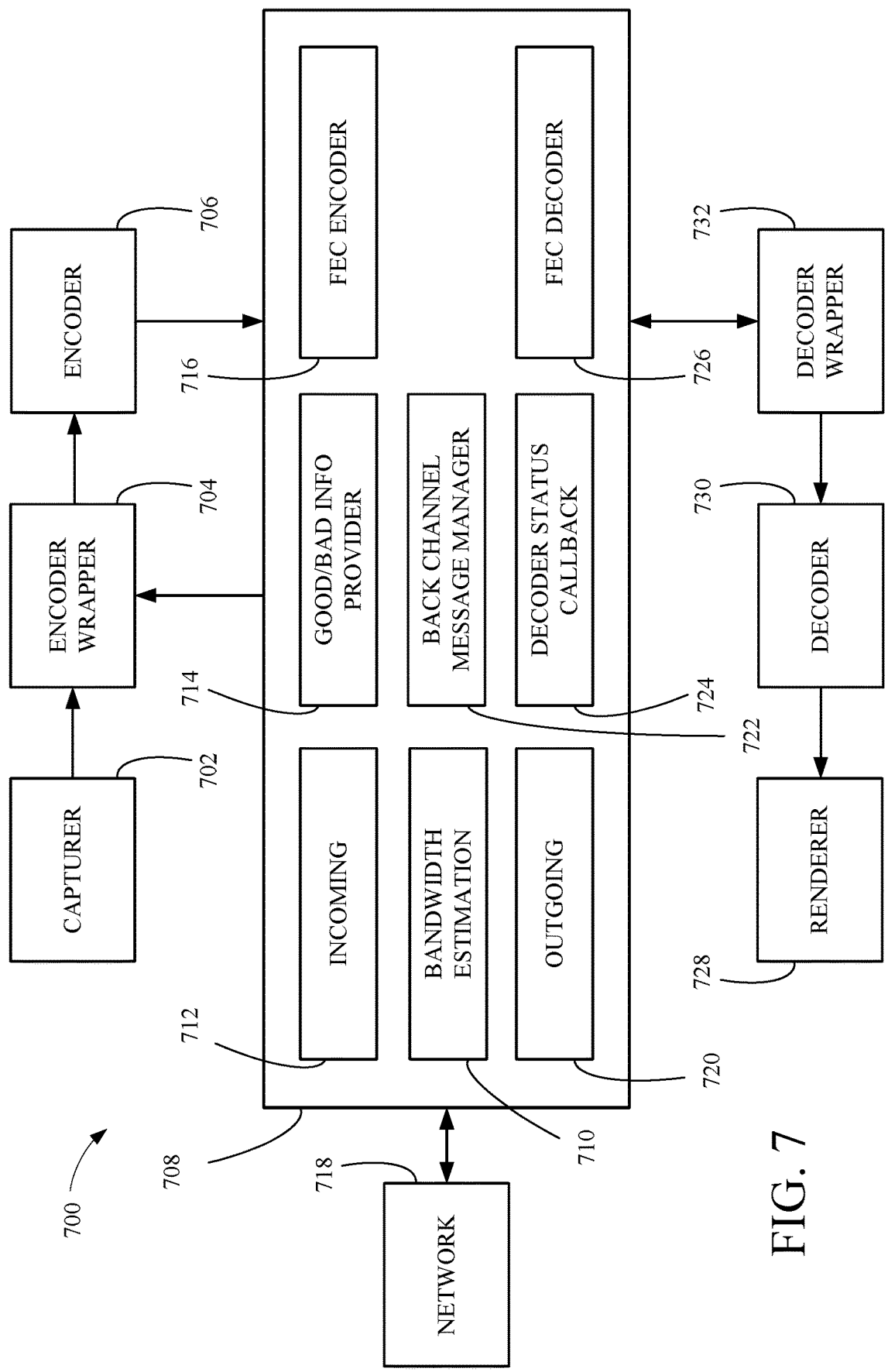
FIG. 7 is a diagram of an example video encoding and decoding system including a back channel message manager in accordance with implementations of this disclosure.

FIG. 7 is a block diagram illustrating an example of a codec 700 including a back channel message manager according to disclosed implementations. Codec 700 can implement processes 500C-500D, 600A-600D as shown in to FIGS. 5A-5D, and 6A-6D as described above. Codec 700 can be implemented using a computing device 12, 14. Codec 700 can either encode a video stream 200 or decode a video bitstream 322 depending upon how it is instructed at run time. Codec 700 can acquire video stream data 200 using a capturer 702. Capturer 702 can acquire uncompressed video stream data either via live data acquisition, for example with a video camera, or by reading video stream data from a storage device or a network, for example.

When codec 700 is operating as an encoder, capturer 702 can pass the uncompressed video stream 200 to encoder wrapper 704. Encoder wrapper 704 can examine the input uncompressed video stream 200, receive parameters (e.g., from back channel messages) from back channel controller 708 and read stored parameters and statistics from non-transitory storage devices to determine encoder parameters to send to encoder 706 along with the video stream 200. Encoder 706 can be an encoder similar to encoder 300 in FIG. 3. Encoder 706 can use the received encoder parameters to encode the video stream 200 to result in an encoded video bitstream 322 having an estimated bitrate selected by back channel controller 708. Encoder can pass the packets included in the encoded video bitstream to FEC encoder 716, where FEC packets can be created and added to the output video bitstream according to FEC encoding parameters including FEC_ratio for example. The FEC encoder can then pass the packets included in the output video bitstream to the outgoing 720 data module for transmission via network 718.

When codec 700 is operating as a decoder, packets included in an encoded video bitstream 322 can be received from network 718 by incoming 712 data module and passed to FEC decoder 726. FEC decoder can strip FEC packets from the incoming video bitstream and restore lost or corrupt packets if necessary and if possible. FEC decoder can send information regarding lost or unrecoverable packets to good/bad info provider 714, for example. FEC decoder can then send the video bitstream 322 to decoder wrapper 732 along with decoder parameters. Decoder wrapper can examine the video bitstream and return parameter information, for example timestamps and sequence numbers of packets, to decoder status callback 724. Decoder 730 can be similar to decoder 400 shown in FIG. 4. Decoder 730 can decode the video bitstream 322 according to the passed decoder parameters and output the decoded video stream to render 728, where the video stream can be rendered for display on a display device attached to decoding computing device 14 or stored on a non-transitory storage device, for example.

In addition to encoding and decoding video data, codec 700 can include back channel message manager 722, which can be a part of a controller (also called "back channel controller") 708. Back channel message manager 722 is responsible for creating, transmitting and receiving messages such as Call and Answer messages as described above. When operating in encoding mode, back channel message manager 722 can transmit Call messages via outgoing 720 data module to the network 718 and receive Answer messages from the network 718 via incoming 712 data module. The received Answer messages can be used and analyzed by bandwidth estimation module 710 to determine network parameters. In some implementations described above, the network parameters can include one or more of, for example, Btotal, bandwidth indicator, Tdacc, Rbitrate, Packetlossratio, and so on, which can be used for bandwidth estimation (e.g., initial bandwidth estimation) or adjustment. The parameters can be included in the back channel messages (e.g., Call and Answer messages). The back channel message manager 722 can send and receive back channel messages (e.g., Call and Answer messages) via incoming 712 and outgoing 720 ports and manage the calculation and collection of network parameters using decoder status callback 724 and bandwidth estimation module 710 to be used in setting encoder parameters. Operating in decoding mode, back channel message manager 722 can receive Call messages from network 718 using incoming 712 port, determine network parameters using bandwidth estimation module 710 and create Answer messages to transmit via outgoing 720 port and network 718.

Bandwidth estimation module 710 can estimate available network bandwidth based on received and calculated network parameters including round trip delay, decoder side receiving bitrate, packet loss ratio and decoder side bandwidth indicators including bandwidth indicator and accumulated indicator. Example processes of bandwidth estimation module 710 have been previously discussed in connection with FIGS. 5A-5C, 6A-6E. Encoding parameters determined by controller 708 can, for example, include FEC strength, bitrate, the number of reference frames and which reference frames to use. The FEC encoder can adaptively change it FEC strength and packet size according to encoding parameters determined by the controller 708.

One aspect of codec 700 is the ability to change the number of reference frames used for intra prediction dynamically to suit changing network conditions.

Figure 8:
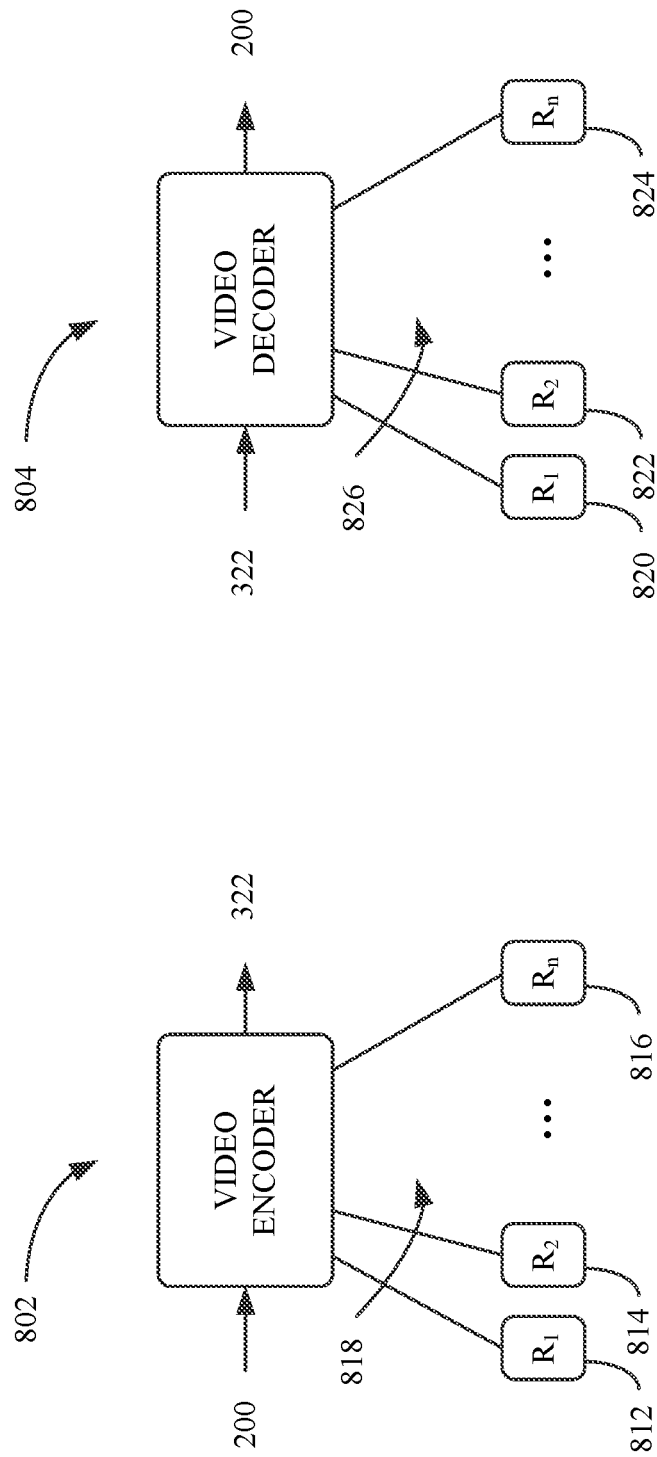
FIG. 8 is a diagram of an example reference frame selection for an encoder and a decoder in accordance with implementations of this disclosure.

FIG. 8 shows an encoder 802 inputting a video stream 200 to be encoded to a video bitstream 322. Video encoder 802 can use some number 818 of reference frames R1, R2, . . . , Rn 812, 814, 816 to encode video bitstream 322. Using a greater number of reference frames can improve the quality of the transmitted video bitstream but can require greater network bandwidth. Adjusting the number of reference frames to use 818 can match the number of reference frames required to be transmitted to the available network bandwidth. Video decoder 804 can adjust the number 826 of decoded reference frames R1, R2, . . . Rn 820, 822, 824 used to decode video bitstream 322 to match the number of reference frames used to encode the video bitstream by encoder 802 by receiving parameters describing the number of frames and other data associated with the reference frames from encoder 802 either directly in the video bitstream of via a back channel message.

Figure 9:
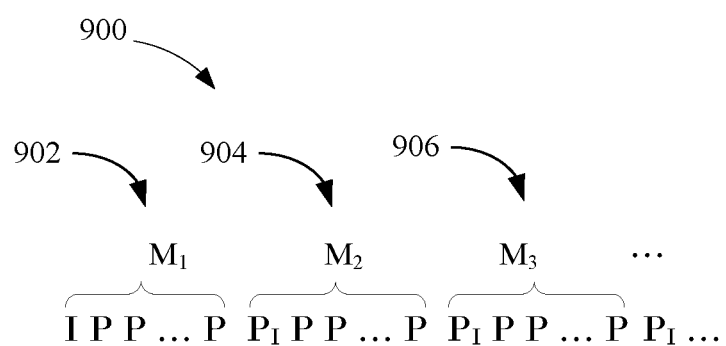
FIG. 9 is a diagram of an example video reference frame structure in accordance with implementations of this disclosure.

FIG. 9 shows an example of selecting a reference frame in accordance with disclosed implementations. FIG. 9 shows a video stream 900, including groups of frames M1, M2 and M3. Group M1 includes an intra-coded reference frame I and predicted frames P. The predicted frames P can be reconstructed using information included in I and prediction information encoded in the video bitstream. Group M2 includes a first frame PI, where frame PI is encoded using a known good reference frame in the decoder buffer. A reference frame is a good reference frame if the decoder (receiver) is able to decode the reference frame without any error. In some implementations, for a reference frame to be a good reference frame, the needed reference frames are also without any error. The good reference is a known good reference frame if the good reference frame is known to the encoder to be error-free. The good reference frame does not need to be an I-frame, and can be reconstructed from previously (correctly) decoded frames such as frame I from group M1. This means that a separate I-frame does not have to be transmitted for frame group M2. For example, once the decoder (receiver) determines that PI is a good reference frame in the decoder buffer, it can indicate to the encoder (sender) that PI is a good reference to the encoder, either directly in the bitstream or via a back channel message. Thus, the encoder (sender) knows that PI is a good reference frame and can be used for predicting the subsequent frames. Likewise, frame group M3 includes a frame PI that can also be reconstructed from a known good reference frame indicated by the back channel messages at run time, therefore not requiring transmission of a separate I-frame to reconstruct the predicted frames P of group M3. As shown by the ellipses in FIG. 9, this scheme can be continued further for additional groups of frames.

Through the back channel message manager 722 at the back channel control 708, the video encoder can use feedback information from the decoder to determine which reference frame should be used for encoding. For example, a good reference frame, or any reference frame can be chosen for encoding, depending on coding efficiency and bandwidth condition at the time. The encoder can switch between, for example, the different options of reference frames, and different number of frames in each group that use the same reference frame to better adjust to the current network condition based on the feedback information.

Encoder (sender) can, for example, switch between using a known good reference frame and using any reference frame (e.g., the frame immediately preceding the current frame) for encoding a current frame of the video bitstream 322. The selection can be based on, for example, tradeoffs between coding efficiency and quality. For example, when selecting any reference frame (e.g., the frame immediately preceding the current frame), better coding efficiency is achieved but the decoded video can have lower quality due to errors occurred during transmission.

When the selected reference frame is a good reference frame, the same good reference frame can be used for encoding, for example, a number of consecutive frames including the current frame. The number of consecutive frames (e.g., M2 or M3 in FIG. 9) encoded using the same good reference frame can be adaptively selected based on packet loss rate, bandwidth data, FEC strength, or any combination of the above. For example in FIG. 9, the number of frames in each group such as M1 M2 M3 . . . Mi can be dynamically changed at a frame boundary, and the value of each group M1 M2 M3 . . . Mi can be determined by packet loss rate, bandwidth, FEC strength, or any combination of above. The encoding parameters can be updated based on, for example, FEC strength, bitrate, and the number of consecutive frames encoded using the same good references frame, or any combination of the above.

In some implementations, the FEC strength can be determined by a FEC encoder based on the data received from the decoding computing device for encoding the video bitstream, and the FEC encoder can adaptively change the FEC strength and packet size based on the data received from the decoding computing device for encoding the video bitstream (e.g., feedback information). The data received for encoding the video bitstream (e.g., feedback information) can further include, for example, packet loss ratio, round trip delay, receiving bitrate, bandwidth data, and data indicating whether a reference frame is good or bad, etc. The encoding parameters can, for example, include estimated bandwidth, which can be determined based on the bandwidth data received in the feedback information.

The implementations of encoding and decoding described above illustrate some exemplary encoding and decoding techniques. However, encoding and decoding, as those terms are used in the claims, could mean compression, decompression, transformation, or any other processing or change of data.

The implementations of transmitting station 12 and/or receiving station 30 and the algorithms, methods, instructions, and such stored thereon and/or executed thereby can be realized in hardware, software, or any combination thereof. The hardware can include, for example, computers, intellectual property (IP) cores, ASICs, programmable logic arrays, optical processors, programmable logic controllers, microcode, microcontrollers, servers, microprocessors, digital signal processors or any other suitable circuit. In the claims, the term "processor" encompasses any of the foregoing hardware, either singly or in combination. The terms "signal" and "data" are used interchangeably. Further, portions of transmitting station 12 and receiving station 30 do not necessarily have to be implemented in the same manner.

Further, in one implementation, for example, transmitting station 12 or receiving station 30 can be implemented using a general purpose computer/processor with a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a cell phone or other hand-held communications device. In this instance, transmitting station 12 can encode content using an encoder 70 into an encoded video signal and transmit the encoded video signal to the communications device. In turn, the communications device can then decode the encoded video signal using decoder 100. Alternatively, the communications device can decode content stored locally on the communications device, such as content that was not transmitted by transmitting station 12. Other suitable transmitting station 12 and receiving station 30 implementation schemes are available. For example, receiving station 30 can be a generally stationary personal computer rather than a portable communications device and/or a device including encoder 70 can also include decoder 100.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's can contain other general or special purpose blocks as well. An example FPGA can be programmed based on a hardware definition language (HDL) design, such as VHSIC Hardware Description Language or Verilog.

The aspects herein can be described in terms of functional block components and various processing operations. Such functional blocks can be realized by any number of hardware and/or software components that perform the specified functions. For example, the described aspects can employ various integrated circuit components, e.g., memory elements, processing elements, logic elements, look-up tables, and the like, which can carry out a variety of functions under the control of one or more microprocessors or other control devices. Similarly, where the elements of the described aspects are implemented using software programming or software elements the invention can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the invention could employ any number of conventional techniques for electronics configuration, signal processing and/or control, data processing and the like. The words "mechanism" and "element" are used broadly and are not limited to mechanical or physical embodiments or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention can be implemented using machine readable instructions in the form of code for operation of any or any combination of the aforementioned computational hardware. Computational code can be implemented in the form of one or more modules by which individual or combined functions can be performed as a computational tool, the input and output data of each module being passed to/from one or more further module during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

This specification has been set forth with various headings and subheadings. These are included to enhance readability and ease the process of finding and referencing material in the specification. These heading and subheadings are not intended, and should not be used, to affect the interpretation of the claims or limit claim scope in any way. The particular implementations shown and described herein are illustrative examples of the invention and are not intended to otherwise limit the scope of the invention in any way.

All references, including publications, patent applications, and patents, cited herein are hereby incorporated by reference to the same extent as if each reference were individually and specifically indicated as incorporated by reference and were set forth in its entirety herein.

The above-described aspects have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of adjusting bandwidth for transmitting a video bitstream to a receiver, comprising:
    transmitting, by a sender, a first portion of the video bitstream encoded using a current bitrate and transmitted as a series of data packets;
    receiving, by the sender from the receiver, a back channel message,
        wherein the back channel message comprises receiver-side bandwidth parameters determined by the receiver in response to receiving the series of data packets, and
        wherein the receiver-side bandwidth parameters comprise a bandwidth indicator parameter and an accumulated time difference parameter,
    adjusting, by the sender using the processor, the current bitrate for encoding the video bitstream based on the bandwidth indicator parameter and the accumulated time difference parameter of the receiver-side bandwidth parameters, further comprising:
    based on a determination that the absolute difference of the bandwidth indicator parameter and a preset threshold meets a first criteria and the accumulated time difference parameter meets a second criteria, adjusting the current bitrate by multiplying the current bitrate with both the bandwidth indicator parameter and a first incremental value,
    wherein the bandwidth indicator parameter is determined, by the receiver, based on a ratio of a time window preset by the sender and a time stamp difference between the time stamp of a first data packet to arrive at the receiver within the time window and the time stamp of a last data packet to arrive at the receiver within the time window, the first and second data packets are associated with the series of data packets, and
    wherein the accumulated time difference parameter is determined based on a difference between a time stamp difference and a time period, wherein the time stamp difference is determined between the time stamp of the last data packet to arrive at the receiver within the time window and the time stamp of the first data packet of the series of data packets, and the time period is determined by the receiver as a difference between a current local time and a local time when the first data packet arrives at the receiver; and
    transmitting, to the receiver, a second portion of the video bitstream encoded using the adjusted current bitrate.

2. The method of claim 1, wherein adjusting, by the sender using the processor, the current bitrate for encoding the video bitstream based on the bandwidth indicator parameter and the accumulated time difference parameter of the receiver-side bandwidth parameters further comprises:
    prior to adjusting the current bitrate by multiplying the current bitrate with the bandwidth indicator parameter and a first incremental value, adjusting the current bitrate by a FEC_ratio parameter indicative of a ratio between video bitstream data packets and FEC packets so as to increment the current bitrate proportional to amount of FEC protection, wherein each data packet in the series of data packets comprises a sequence number and a time stamp associated with the sequence number.

3. The method of claim 1, further comprising:
    based on a determination that the bandwidth indicator parameter is greater than a second incremental value, adjusting the current bitrate by multiplying the current bitrate only with the second incremental value, wherein the bandwidth indicator parameter is indicative of one of: a status of network delay increase, a status of normal transmission, and a status of network delay improvement.

4. The method of claim 1, wherein the receiver-side bandwidth parameters further comprise at least one of: a received bitrate parameter, a packet loss ratio parameter, and a forward error correction (FEC) ratio parameter.

5. The method of claim 3, wherein the bandwidth indicator parameter is indicative of the status of network delay improvement based on a determination that the time stamp difference is less than the time window.

6. The method of claim 1, wherein the series of data packets has the same synchronization source identity (SSRC).

7. The method of claim 4, wherein the received bitrate parameter is determined as total bits of all packets received in the time window divided by a duration of the time window.

8. The method of claim 1, wherein the back channel message comprises good-or-bad reference data indicating whether a frame decoded from the encoded first portion of the video bitstream is correctly decoded from a good reference frame.

9. The method of claim 8, further comprising:
    determining, based on the good-or-bad reference data, whether the encoded first portion of the video bitstream comprises a good reference frame;
    based on a determination that the encoded first portion of the video bitstream comprises the good reference frame, encoding the second portion of the video bitstream using the good reference frame and the adjusted current bitrate; and
    based on a determination that the encoded first portion of the video bitstream comprises no good reference frame, encoding the first and second portions of the video bitstream using the adjusted current bitrate.

10. The method of claim 1, wherein the series of data packets has a packet size determined as a function of the adjusted current bitrate, wherein the packet size increases when the adjusted current bitrate increases above a predetermined threshold.

11. A method of adjusting bandwidth for receiving a video bitstream from a sender, comprising:
- receiving, by a receiver, a series of data packets associated with a first portion of the video bitstream encoded using a current bitrate;
- determining, by the receiver using a processor, receiver-side bandwidth parameters based on the series of data packets, wherein the receiver-side bandwidth parameters comprise an accumulated time difference parameter determined based on a difference between a time stamp difference and a time period, wherein
  - the time stamp difference is determined between the time stamp of the last data packet to arrive at the receiver within the time window and the time stamp of the first data packet of the series of data packets, and
  - the time period is determined by the receiver as a difference between a current local time and a local time when the first data packet arrives at the receiver;
- decoding the encoded first portion of the video bitstream from the series of data packets;
- transmitting, to the sender, back channel messages, each comprising the receiver-side bandwidth parameters; and
- receiving, from the sender, a second portion of the video bitstream encoded using an adjusted current bitrate determined based on the receiver-side bandwidth parameters in response to receiving the back channel messages,
  - wherein the current bitrate is adjusted based on the bandwidth indicator parameter and the accumulated time difference parameter of the receiver-side bandwidth parameters,
  - wherein based on a determination that the absolute difference of the bandwidth indicator parameter and a preset threshold meets a first criteria and the accumulated time difference parameter meets a second criteria, the current bitrate is adjusted by multiplying the current bitrate with both the bandwidth indicator parameter and a first incremental value,
  - wherein the bandwidth indicator parameter is determined, by the receiver, based on a ratio of a time window preset by the sender and a time stamp difference between the time stamp of a first data packet to arrive at the receiver within the time window and the time stamp of a last data packet to arrive at the receiver within the time window, the first and second data packets are associated with the series of data packets, and
  - wherein the accumulated time difference parameter is determined based on a difference between a time stamp difference and a time period, wherein the time stamp difference is determined between the time stamp of the last a data packet to arrive at the receiver within the time window and the time stamp of the first data packet of the series of data packets, and the time period is determined by the receiver as a difference between a current local time and a local time when the first data packet arrives at the receiver.

12. The method of claim 11, wherein the bandwidth indicator parameter is indicative of one of: a status of network delay increase, a status of normal transmission, and a status of network delay improvement.

13. The method of claim 11, wherein the receiver-side ratio parameter.

14. The method of claim 13, wherein the bandwidth indicator parameter is indicative of the status of network delay improvement based on a determination that the time stamp difference is less than the time window.

15. The method of claim 13, wherein the bandwidth indicator parameter is determined based on a ratio of a time window preset by the sender and a time stamp difference between the time stamp of a first data packet to arrive at the receiver within the time window and the time stamp of a last data packet to arrive at the receiver within the time window, and the first and second data packets are associated with the series of data packets.

16. The method of claim 15, further comprising:
- receiving a next series of data packets having a next SSRC, wherein the next SSRC is different from the SSRC; and
- resetting values of the local time when the first data packet arrives at the receiver and the time stamp of the first data packet of the series of data packets to synchronize with the first packet of the next series of data packets.

17. The method of claim 11, wherein prior to adjusting the current bitrate by multiplying the current bitrate with the bandwidth indicator parameter and a first incremental value, the current bitrate is further adjusted a FEC_ratio parameter indicative of a ratio between video bitstream data packs and FEC packets so as to increment the current bitrate proportional to amount of FEC protection.

18. The method of claim 11, wherein each of the back channel messages comprises good-or-bad reference data indicating whether a frame in the decoded first portion of the video bitstream is correctly decoded from a good reference frame.

19. The method of claim 18, wherein receiving, from the sender, the second portion of the video bitstream encoded using the adjusted current bitrate determined based on the receiver-side bandwidth parameters in response to receiving the back channel messages comprises:
- receiving, from the sender, the second portion of the video bitstream encoded using the good reference frame based on the good-or-bad reference data, wherein the good reference frame has been previously decoded from the encoded first portion of the video bitstream.

20. The method of claim 19,
- wherein based on a determination that the bandwidth indicator parameter is greater than a second incremental value, the current bitrate is adjusted by multiplying the current bitrate only with the second incremental value.

* * * * *